US011085289B2

(12) United States Patent
Guijt et al.

(10) Patent No.: US 11,085,289 B2
(45) Date of Patent: Aug. 10, 2021

(54) DISTRIBUTED REMOTE LOGGING

(71) Applicant: Baker Hughes, a GE company, LLC, Houston, TX (US)

(72) Inventors: Peter J. Guijt, Houston, TX (US); Nigel N. Smith, Houston, TX (US); Douglas C. Young, Houston, TX (US); Harold Andrade, The Woodlands, TX (US); Homero C. Castillo, Kingwood, TX (US); Otto N. Fanini, Houston, TX (US)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 0 days.

(21) Appl. No.: 16/155,820

(22) Filed: Oct. 9, 2018

(65) Prior Publication Data

US 2020/0208510 A1 Jul. 2, 2020

Related U.S. Application Data

(63) Continuation-in-part of application No. 15/600,035, filed on May 19, 2017, now Pat. No. 10,094,213.

(51) Int. Cl.
*E21B 47/13* (2012.01)
*G01V 1/40* (2006.01)
*E21B 47/26* (2012.01)

(52) U.S. Cl.
CPC .............. *E21B 47/13* (2020.05); *E21B 47/26* (2020.05); *G01V 1/40* (2013.01)

(58) Field of Classification Search
USPC ................................................. 340/850, 851
See application file for complete search history.

(56) References Cited

U.S. PATENT DOCUMENTS 5,689,641 A 11/1997 Ludwig et al.
5,959,547 A 9/1999 Tubel et al.
(Continued)

FOREIGN PATENT DOCUMENTS

WO 0225319 A2 3/2002
WO 2014078836 A1 5/2014

OTHER PUBLICATIONS

PCT/US2018/033483 ISR and Written Opinion, dated Nov. 15, 2018.

*Primary Examiner* — Omar Casillashernandez
(74) *Attorney, Agent, or Firm* — Mossman Kumar & Tyler PC

(57) ABSTRACT

Methods, systems, and apparatuses for remote well operation control. Methods include conducting, with a plurality of remote well operation control hosts operating on corresponding remote well logging data acquisition management systems, a well operation using a well operation system at a well, wherein the well operation system includes a carrier having disposed thereon at least one logging instrument. Methods may include establishing a first operational control relationship between the carrier and a first of the plurality of remote well operation control hosts sufficient for the first remote well operation control host to control the carrier; and establishing a second operational control relationship between a selected one of the at least one logging instrument and a second remote well operation control host different than the first, the operational control relationship sufficient for the second remote well operation control host to control the at least one logging instrument and receive logging data.

19 Claims, 16 Drawing Sheets

(56) References Cited

U.S. PATENT DOCUMENTS

| | | | |
|---|---|---|---|
| 6,046,685 A | 4/2000 | Tubel | |
| 6,139,197 A | 10/2000 | Banks | |
| 6,223,206 B1 | 4/2001 | Dan et al. | |
| 6,801,949 B1 | 10/2004 | Bruck et al. | |
| 6,842,768 B1 | 1/2005 | Shaffer et al. | |
| 6,896,056 B2 | 5/2005 | Mendez et al. | |
| 6,980,929 B2 | 12/2005 | Aronstam et al. | |
| 7,228,903 B2 | 6/2007 | Wang et al. | |
| 7,305,305 B2 | 12/2007 | Beeson | |
| 7,403,000 B2 | 7/2008 | Barolak et al. | |
| 7,525,872 B2 | 4/2009 | Tang et al. | |
| 7,672,262 B2 | 3/2010 | McCoy et al. | |
| 7,787,327 B2 | 8/2010 | Tang et al. | |
| 7,795,864 B2 | 9/2010 | Barolak et al. | |
| 8,055,448 B2 | 11/2011 | Mathiszik et al. | |
| 8,061,206 B2 | 11/2011 | Bolshakov et al. | |
| 8,788,207 B2 | 7/2014 | Pei et al. | |
| 8,811,114 B2 | 8/2014 | Geerits et al. | |
| 9,103,196 B2 | 8/2015 | Zhao et al. | |
| 9,569,097 B2 | 2/2017 | Ramachandran et al. | |
| 9,581,720 B2 | 2/2017 | Dorovsky et al. | |
| 2002/0171560 A1* | 11/2002 | Ciglenec | E21B 29/06 340/853.1 |
| 2004/0134667 A1 | 7/2004 | Brewer et al. | |
| 2007/0237402 A1 | 10/2007 | Dekel et al. | |
| 2010/0147510 A1 | 6/2010 | Kwok et al. | |
| 2012/0026002 A1* | 2/2012 | Vu | E21B 47/00 340/854.6 |
| 2013/0173505 A1* | 7/2013 | Balogun | E21B 43/121 706/12 |
| 2014/0019049 A1 | 1/2014 | Dorovsky et al. | |
| 2014/0158350 A1* | 6/2014 | Castillo | E21B 23/10 166/250.17 |
| 2015/0041120 A1* | 2/2015 | Gumarov | E21B 47/10 166/250.1 |
| 2016/0084029 A1* | 3/2016 | Castillo | E21B 31/00 166/297 |
| 2016/0084076 A1* | 3/2016 | Fanini | H04L 67/12 340/853.1 |
| 2016/0186552 A1* | 6/2016 | Penn | E21B 44/00 700/275 |
| 2017/0102479 A1 | 4/2017 | Kouchmeshky et al. | |

* cited by examiner

DISTRIBUTED REMOTE LOGGING

CROSS REFERENCE TO RELATED APPLICATIONS

This application is a continuation-in-part of U.S. application Ser. No. 15/600,035 filed May 19, 2017, the entire disclosure of which is incorporated herein by reference in its entirety.

FIELD OF THE DISCLOSURE

This disclosure generally relates to borehole tools, and in particular to methods and apparatuses for conducting well logging.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more.

In conventional oil well logging, during well drilling and/or after a well has been drilled, instruments may be conveyed into the borehole and used to determine one or more parameters of interest related to the formation. A rigid or non-rigid conveyance device is often used to convey the instruments, often as part of a tool or a set of tools, and the conveyance device may also provide communication channels for sending information up to the surface.

During or after drilling, these instruments in the wellbore are used to carry out any number of subterranean investigations of the earth formation or of infrastructure associated with the wellbore. Several instruments may be housed in a single tool, multiple tools may be connected on a single conveyance device, or both. Thus, the tools may include variety of sensors and/or electronics for formation evaluation, monitoring and controlling the instruments, monitoring and controlling the conveyance device, and so on. Aspects of control of these instruments to conduct investigations are carried out by electronics downhole and by control equipment and/or personnel at the well surface, which may be connected by a local area network ('LAN'). Optionally, remotely located control equipment and/or personnel may send commands to logging instruments, e.g., over a wide-area network ('WAN').

A LAN is a computer network that spans a relatively small area. Many LANs are confined to a single building or group of buildings, or a single well site. However, one LAN can be connected to other LANs over any distance (e.g., via telephone lines, fiber networks, radio waves, etc.). A wide-area network ('WAN') is a system of LANs connected in this way. The Internet is an example of a WAN.

SUMMARY OF THE DISCLOSURE

In aspects, the present disclosure is related to methods, systems, and apparatuses for conducting remote well operations, and more particularly to remote well operation control. Methods include conducting, with a plurality of remote well operation control hosts operating on corresponding remote well logging data acquisition management systems, a well operation using a well operation system at a well, wherein the well operation system includes a carrier having disposed thereon at least one logging instrument. Methods may include establishing a first operational control relationship between the carrier and a first of the plurality of remote well operation control hosts sufficient for the first remote well operation control host to control the carrier responsive to at least one well-logging command from the first remote well operation control host; and establishing a second operational control relationship between a selected one of the at least one logging instrument and a second remote well operation control host of the plurality different than the first, the operational control relationship sufficient for the second remote well operation control host to control the at least one logging instrument responsive to at least one well-logging command from the second remote well operation control host and receive logging data.

Methods may include operating the carrier responsive to at least one well-logging command received from the first remote well operation control host of the plurality; and operating the logging instrument responsive to at least one well-logging command received from the second remote well operation control host of the plurality. Methods may include, over at least one interval of time, identically processing the logging data at the local well operation control host in parallel with processing the logging data at the second remote well operation control host, substantially simultaneously.

Methods may include, during a logging operation, using a Wide Area Network (WAN) to transmit substantially all substantially maximum resolution raw well logging data generated by the selected one of the at least one logging instrument from the well to at least one of the plurality of remote well operation control hosts; and using the logging data to control the well operation with at least one second command in substantially real-time from the at least one of the plurality of remote well operation control hosts responsive to the logging data received. Methods may include operating a second logging instrument responsive to at least one well-logging command from the second remote well operation control host, and/or operating a second logging instrument on the carrier responsive to at least one well-logging command from a third remote well operation control host of the plurality different than the first and second. The carrier may be at least one of i) a drill string; ii) a wireline; and iii) a downhole tool.

The well operation may comprise at least one of: i) geosteering; ii) drilling at least one borehole in a formation; iii) performing measurements on a formation; iv) estimating parameters of a formation; v) installing equipment in a borehole; vi) evaluating a formation; vii) optimizing present or future development in a formation or in a similar formation; viii) optimizing present or future exploration in a formation or in a similar formation; ix) producing one or more hydrocarbons from a formation; x) performing maritime logging operations of a seabed.

Methods may include conducting, with the plurality of remote well operation control hosts operating on the corresponding remote well logging data acquisition management systems, a second well operation using a second well operation system at a second well remote from the first well, wherein the second well operation system includes a second conveyance device having disposed thereon a third logging instrument and a fourth logging instrument.

Methods may include establishing a third operational control relationship between the third logging instrument and a first of the plurality of remote well operation control hosts sufficient for the first remote well operation control host to control the third logging instrument responsive to at least one well-logging command from the first remote well operation control host; establishing a fourth operational control relationship between a fourth logging instrument and the second remote well operation control host, the operational control relationship sufficient for the second remote well operation control host to control the fourth logging instrument responsive to at least one well-logging command from the second remote well operation control host.

Methods may include enabling i) operation of the carrier by the first remote well operation control host, ii) operation of the selected one of the at least one logging instrument by the second remote well operation control host, iii) operation of the third logging instrument by the first remote well operation control host, and iv) operation of the fourth logging instrument by the second remote well operation control host by: using a master remote well operation control host, of the plurality of remote well operation control hosts, on a corresponding remote well logging data acquisition management system to establish the third operational control relationship and the fourth operational control relationship.

Methods may include enabling operation of the carrier by the first remote well operation control host and operation of the selected one of the at least one logging instrument by the second remote well operation control host by using a master remote well operation control host, of the plurality of remote well operation control hosts, on a corresponding remote well logging data acquisition management system to distribute control capabilities by establishing the first operational control relationship and the second operational control relationship.

Methods may include establishing the first operational control relationship and the second operational control relationship in dependence upon a role associated with at least one of: i) the first remote well operation control host, and ii) the second remote well operation control host.

Methods may include conducting, with a plurality of remote well operation control hosts operating on corresponding remote well logging data acquisition management systems, a well operation using a well operation system at a well, wherein the well operation system includes a carrier having disposed thereon a plurality of logging instruments. Methods may include establishing a first operational control relationship between a first logging instrument of the plurality of logging instruments and a first of the plurality of remote well operation control hosts, the operational control relationship sufficient for the first remote well operation control host to control the first logging instrument responsive to at least one well-logging command from the first remote well operation control host; establishing a second operational control relationship between a second of the plurality of logging instruments and a second remote well operation control host of the plurality different than the first, the operational control relationship sufficient for the second remote well operation control host to control the second logging instrument responsive to at least one well-logging command from the second remote well operation control host.

General method embodiments may include methods, systems, and apparatuses for conducting well operations. Methods embodiments may include allocating control of an operational resource located at a well, the control of the resource sufficient for conducting at least a portion of the well operations. This may be carried out by maintaining a database associating a plurality of remote well operational control hosts with corresponding roles, wherein at least some roles of the corresponding roles are associated with privileges to corresponding operational resources; and allocating control of an operational resource to a first remote well operational control host of the plurality in dependence upon the role associated with the remote well operational control host. This may be carried out by referencing those privileges associated with the role. The database may be remote from the local well operation control host, and the method may include retrieving to the local well operation control host the role associated with the remote well operational control host of the plurality.

Methods may include determining an operational state of the resource. Allocating control of the operational resource to the remote well operational control host may include allocating control of the operational resource to the remote well operational control host in dependence upon the role associated with the remote well operational control host and the operational state of the resource. Methods may include determining an operational state of the well; allocating control of the operational resource to the remote well operational control host may comprise allocating control of the operational resource to the remote well operational control host in dependence upon the role associated with the remote well operational control host and the operational state of the well.

Methods may include allocating control of the operational resource to a local well operation control host while in a default operational state. The allocating may be an initial allocation of the role. The allocating may be a role modification. The role modification may include identifying the first remote well operational control host as being associated with the role modification; and associating the first remote well operational control host with the role. A role modification may include identifying a second remote well operational control host as being associated with the role modification; and associating the second remote well operational control host with the role. The role modification may include modifying at least a pre-existing role associated with the first remote well operational control host to the role; and modifying at least the role, associated with a second remote well operational control host, to another role. Methods may include triggering the role modification in response to detecting a role shift event.

Roles may be associated with constraints and/or a credentials profile. A remote well operational control host may have credentials associated with it. Identifying a remote well operational control host for association with privileges may include selecting the remote well operational control host in dependence upon the comparison. It may include selecting the remote well operational control host in dependence upon the comparison and at least one selection rule.

In aspects, the present disclosure is related to methods, systems, and apparatuses for remote well logging. Methods include conducting, with a plurality of remote well operation control hosts operating on corresponding remote well logging data acquisition management systems, a well logging operation using a well logging system at a logging site, wherein the well logging system includes a conveyance device having disposed thereon a first logging instrument and a second logging instrument; operating the first logging instrument responsive to at least one well-logging command from a first remote well operation control host of the plurality; and operating the second logging instrument responsive to at least one well-logging command from a second remote well operation control host of the plurality different than the first.

The conveyance device, or carrier, may include at least one of i) a drill string; and ii) a wireline. Where the carrier comprises a drill string, the logging tool may include a bottom hole assembly (BHA). Methods may include performing drilling operations by rotating a drill bit disposed at a distal end of the drill string and taking well logging measurements to generate raw well logging data during drilling operations.

Methods may include acquiring raw well logging data from the first logging instrument and the second logging instrument by a local well operation control host on a corresponding well logging data acquisition management system at the logging site; mirroring the acquired raw well logging data to at least one of the plurality of remote well operation control hosts; and issuing a further command from at least one of the plurality of remote well operation control hosts responsive to the acquired raw well logging data.

Methods may include identically processing the logging data at the local well operation control host in parallel with processing the logging data at the plurality of remote well operation control hosts. Methods may include, during a logging operation, using a Wide Area Network (WAN) to transmit substantially all raw well logging data generated by the first logging instrument and the second logging instrument from the logging site to at least one of the plurality of remote well operation control hosts; and using the logging data to control the logging operation with at least one second command in substantially real-time from the at least one of the plurality of remote well operation control hosts responsive to the logging data received.

Methods may include determining a value for at least one data transfer characteristic (e.g. average throughput, downtime, or failure in a given period) of the WAN with respect to the at least one of the plurality of remote well operation control hosts; making a comparison of the value for the at least one data transfer characteristic with at least one operational sufficiency profile, the at least one operational sufficiency profile representative of data transfer characteristic values indicating data transfer sufficient for control of the logging operation in substantially real-time; and implementing a contingent operational mode in dependence upon the comparison. The implemented contingent operational mode may be selected from a plurality of available contingent operational modes in dependence upon an order of priority of at least one of: i) logging data from the first logging instrument; ii) logging data from the second logging instrument. The implemented contingent operational mode may be selected from a plurality of available contingent operational modes in dependence upon an order of priority of operations between a first logging operation associated with the first logging instrument and second logging operation associated with the first logging instrument.

Methods may include synchronizing the plurality of remote well operation control hosts with the local well operation control host. The well operation control host may be remote from the logging site. Methods may include conveying the conveyance device to intersect a volume of interest relating to the first logging instrument via tool commands from a first of the plurality of remote well operation control hosts; and assigning control of the conveyance device, upon the device intersecting the volume of interest, from the first of the plurality of remote well operation control hosts to a second of the plurality of remote well operation control hosts.

Methods may include, during a logging operation, using a Wide Area Network (WAN) to transmit a virtual presence feed associated with a logging site supervisor from the logging site to at least one of the corresponding remote well logging data acquisition management systems; and using the virtual presence feed to construct a representation of a virtual presence perspective of the position of the logging site supervisor at the logging site, and presenting the representation to a remote well operating engineer at the at least one of the corresponding remote well logging data acquisition management systems. The virtual presence feed may include information representing video, audio, location data (e.g., GPS data), and so on. Methods may include, during the logging operation, using a Wide Area Network (WAN) to transmit audio instruction data and auxiliary data from the at least one of the corresponding remote well logging data acquisition management systems to the logging site; rendering the audio instruction data as audio instructions via a personal communication system of the logging site supervisor; and rendering the auxiliary data on a graphic interface of the personal communication system of the logging site supervisor.

The well logging operation may include at least one of: i) geosteering; ii) drilling at least one borehole in a formation; iii) performing measurements on a formation; iv) estimating parameters of a formation; v) installing equipment in a borehole; vi) evaluating a formation; vii) optimizing present or future development in a formation or in a similar formation; viii) optimizing present or future exploration in a formation or in a similar formation; ix) producing one or more hydrocarbons from a formation; x) performing maritime logging operations of a seabed.

Methods may include conducting, with the plurality of remote well operation control hosts operating on the corresponding remote well logging data acquisition management systems, a second well logging operation using a second well logging system at a second logging site remote from the first logging site, wherein the second well logging system includes a second conveyance device having disposed thereon a third logging instrument and a fourth logging instrument, comprising: operating the third logging instrument responsive to at least one well-logging command from the first remote well operation control host of the plurality; and operating the fourth logging instrument responsive to at least one well-logging command from the second remote well operation control host. Methods may include comprising enabling i) operation of the first logging instrument by the first remote well operation control host, ii) operation of the second logging instrument by the second remote well operation control host, iii) operation of the third logging instrument by the first remote well operation control host, and iv) operation of the fourth logging instrument by the second remote well operation control host by using a master remote well operation control host, of the plurality of remote well operation control hosts, on a corresponding remote well logging data acquisition management system to distribute control capability for a particular instrument to a particular remote well operation control host.

Methods may include enabling operation of the first logging instrument by the first remote well operation control host and operation of the second logging instrument by the second remote well operation control host by using a master remote well operation control host, of the plurality of remote well operation control hosts, on a corresponding remote well logging data acquisition management system to distribute control capability for a particular instrument to a particular remote well operation control host.

Methods may include distributing control capability in dependence upon an operational mode. All the acquired well logging data may pass through the corresponding remote well logging data acquisition management system of the master remote well operation control host. Methods may include controlling the conveyance device using at least one well operation control host of the plurality. Methods may include enabling operation of the first logging instrument by the first remote well operation control host and operation of the second logging instrument by the second remote well operation control host by using a distributed remote cluster to provide logging data related to the first logging instrument and the second logging instrument to the first remote well operation control host and the second remote well operation control host.

Methods as described above implicitly utilize at least one processor. Some embodiments include a non-transitory computer-readable medium product accessible to the processor and having instructions thereon that, when executed, causes the at least one processor to perform methods described above. Apparatus embodiments may include, in addition to specialized borehole measurement equipment and conveyance apparatus, at least one processor and a computer memory accessible to the at least one processor comprising a computer-readable medium having instructions thereon that, when executed, causes the at least one processor to perform methods described above.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
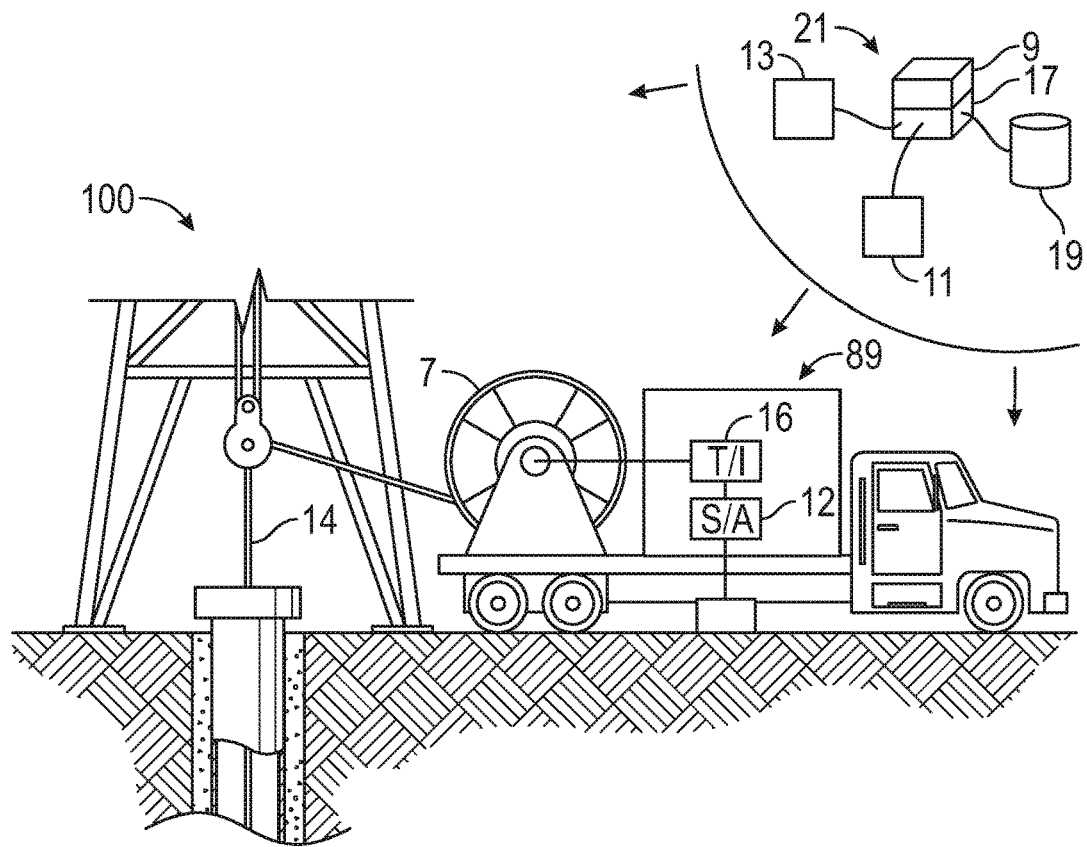
FIG. 1A is a schematic diagram of an example well logging system in accordance with embodiments of the present disclosure.
Figure 1A:
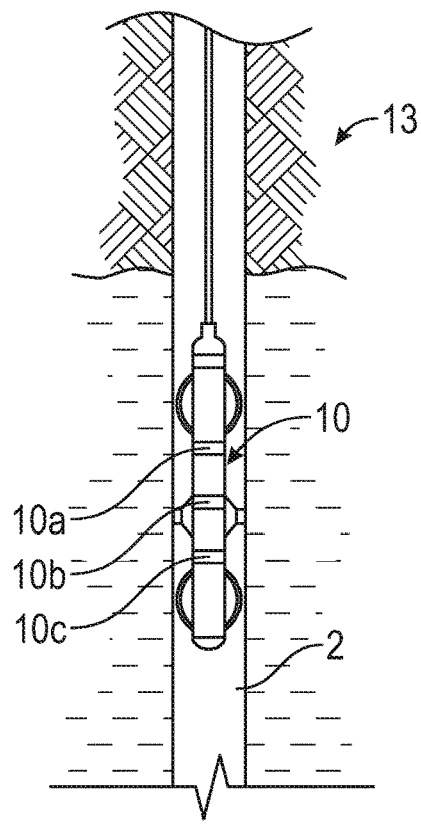

Aspects of the present disclosure relate to apparatus and methods for well operation control, including controlling well operations such as well logging, drilling, productions operations, and so on. Operations may include movement and/or activation of tools in the borehole, extension of the borehole, activation and regulation of supporting systems, installation of infrastructure, or measurement and interpretation of physical phenomena indicative of parameters of interest of the formation, the borehole, infrastructure installed in the formation (e.g., casing), downhole fluids in one of these, or combinations of the same. Techniques described herein are particularly suited to cooperative multi-instrument subterranean investigation. Further aspects include improved control systems, techniques, and structures for subterranean exploration, investigation, monitoring, and development.

In conventional oil well logging, during well drilling and/or after a well has been drilled, instruments conveyed in the wellbore are used in order to carry out any number of subterranean investigations of the earth formation, the borehole, fluid in the formation or borehole, or of infrastructure associated with the wellbore, all of which may be referred to as well logging. Aspects of control of these instruments to conduct investigations are carried out by electronics downhole and by control equipment and/or personnel at the well surface.

In the current standard mode of operation in the wireline logging industry, all downhole measuring equipment is controlled and sensor data is recorded by local data acquisition systems. The local data acquisition system may in some cases be controlled by a remote computer system interface (e.g., using keyboard, mouse, and monitor) over a network connection.

Traditionally, of those personnel at the well site, a well operator is the chief individual responsible for the success of the logging operation. Although rewarding, a career as a well operator may be quite demanding. The well operator (or 'well operations engineer') must be familiar with the functioning of all the instruments conveyed in the borehole, and must understand and communicate job objectives, priorities, and deliverables to other personnel. The well operator must also verify functionality of all the instruments and supporting infrastructure, such as, for example, communications and conveyance devices. Perhaps most importantly, because many operations require conveyance of a carrier in the borehole (e.g., a logging run, or trip), the well operator must also be onsite to manage acquisition of well-logging data via operations of the instruments in conjunction with the greater tool system. All logging tools are affected by environmental conditions. Thus, mitigation of environmental effects with real-time corrections to instruments, conveyance devices, and infrastructure is critical to the production of accurate well logging data.

During data acquisition, the well operator leverages his or her expertise to control the logging instruments downhole in substantially real time. The well operator has a myriad of options available on a minute-by-minute basis to change tool parameters and techniques to optimize well logging results. Traditionally, well operators at a well site have full access to unmitigated (or substantially maximum resolution) raw data communicated uphole from the instruments, although conventionally this is not possible for operators using remote control. In operating each instrument, access to substantially all the raw data has proven critical in optimizing the measurement results from each instrument via real-time adjustments to measurement processes. Raw data may refer to unformatted instrument data representing the instrument response, along with any wrapper necessary for networked or bus communication, which may or may not be encrypted.

However, as the number and variety of well instruments has proliferated and the capabilities of (and the logging processes available from) each instrument have expanded, demands on operational personnel have exceeded the capabilities of a single well operator, particularly in light of required travel. Typically, a variety of unique instruments are conveyed on the tool string. By unique instruments, it is meant that, with respect to one another, two or more instruments having mutually exclusive measurement subject matter (e.g., acoustic and resistivity and gamma ray measurements) or different tool physics (borehole seismic and acoustic borehole imaging) are mounted on the string. A limited number of personnel with the right combination of expertise for a particular job may be required at the same time at wells scattered across the globe.

Aspects of the present disclosure include methods and systems for conducting distributed remote well operations. Processes employed in performing well operations may be distributed to a plurality of remote sites, and/or automated to reduce the burden on the well operator at the local site. A separate remote subject matter expert may individually control each particular downhole instrument, tool, or process responsive to substantially all available logging data. These subject matter experts are uniquely skilled in operations of the instrument. Each of these experts may interact with a different well operation control host running on a separate data acquisition management system at different locations, and each system may be tailored to the logging operations under its control.

All downhole measuring equipment and sensor data may be controlled and transmitted by a local data acquisition management system. This local data acquisition management system may be controlled through a network by one or more remote data acquisition management systems, each of which may include data acquisition control, recording and processing system(s). Either the local acquisition system (see 289, FIG. 2) or a local distribution system (see 803, FIG. 8) may distribute control of the instruments, equipment, personnel, and the like, along with access to data from the local site, by using advanced control architectures as described in greater detail herein below. In particular embodiments, this control and access may be distributed through the granting of privileges to and assignment of processes to an actor (e.g., personnel, processing system, or computer process). Distributed control of a well presents particular challenges that were previously unrecognized or which lacked a solution. Solutions to these challenges are provided herein below.

The raw logging data from the instruments is communicated in full to a local system (that is, at the well site) for storage and management. Substantially all of the raw logging data is also mirrored to the remote system(s) over a network to ensure continuous operation with no data loss under communication interruptions or equipment malfunctions. In some implementations, the local system may connect to a remote data acquisition management system over a network connection, and from there connect to multiple remote computer systems, in order to reduce the load on the network connection between the local and remote systems.

Methods of remote well logging as disclosed herein may include conducting, with a plurality of remote well operation control hosts operating on corresponding remote well logging data acquisition management systems, a well logging operation using a well logging system at a logging site, wherein the well logging system includes a conveyance device having disposed thereon a first logging instrument and a second logging instrument; operating the first logging instrument responsive to at least one well-logging command from a first remote well operation control host of the plurality; and operating the second logging instrument responsive to at least one well-logging command from a second remote well operation control host of the plurality different than the first. The conveyance device may include a tool, tool string, drill string, or the larger tool delivery system.

Aspects of the present disclosure include systems, devices, products, and methods of well logging using logging instruments in a borehole in an earth formation. Methods may include conveying multiple logging instruments in the borehole on at least one conveyance device ('carrier'); taking well logging measurements with the logging instruments, and estimating a property of a subterranean volume of interest.

Aspects of the present disclosure relate to using at least one sensor as part of one or more downhole well logging instruments to produce information responsive to physical phenomena in the earth formation ('logging information'). The information is indicative of a parameter of interest. The term "information" as used herein includes any form of information (analog, digital, EM, printed, etc.), and may include one or more of: raw data, processed data, and signals. When the information has a high granularity bearing directly on the instrument sensor response (tool response) to the physical phenomena, it may be referred to as raw logging data. Logging data is quite voluminous by its nature. One prominent characteristic of raw logging data is that it may be subject to further processing to estimate parameters of interest, and that the particular algorithms used in this processing is subject to change over time and in light of the circumstances and operating environment. Thus, to properly conduct well operations remotely, logging data current to the measurement operation may be a requirement for remote subject matter experts.

Method embodiments in accordance with the present disclosure may include estimating a parameter of interest from the information, evaluating the formation using the parameter of interest, and/or performing further borehole or formation operations in dependence upon the information, the evaluation, or the parameter. In particular embodiments, a state of drilling operations, characteristics of the borehole or formation, or orientation of components of the downhole tool may be estimated using the parameter of interest, and then used in performing an operation as described above.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Referring to FIG. 1A, well logging instruments 10a, 10b, and 10c are shown being lowered into a wellbore 2 penetrating earth formations 13. The instruments 10a, 10b, and 10c may be lowered into the wellbore 2 and withdrawn therefrom by a conveyance device comprising tool 10 and an armored electrical cable 14. The cable 14 and tool 10 may include embedded conductors for power and/or data for providing signal and/or power communication between the surface and downhole instruments (e.g., a seven conductor cable). The cable 14 can be spooled by a winch 7 or similar device known in the art. The cable 14 may be electrically connected to a data acquisition management system 89 which can include a signal decoding and interpretation unit 16 and a recording unit 12. Signals transmitted by the tool 10 along the cable 14 can be decoded, interpreted, recorded and processed by the respective units in the system 89.

In one embodiment, circuitry associated with the tool 10 and instruments 14 (described in further detail below with respect to FIG. 2) may be configured to take measurements as the tool moves along the longitudinal axis of the borehole ('axially'). These instruments 10a, 10b, 10c may generate a signal in response to physical phenomena indicative of properties of the formation (including, for example, "behind-casing evaluation"), the wellbore, the fluid, and so on ('parameters of interest').

These parameters of interest may include information relating to a geological parameter, a geophysical parameter, a petrophysical parameter, and/or a lithological parameter. Thus, the tool 10 may include instruments including sensors for detecting physical phenomena indicative of parameters of interest such as, for example, formation resistivity, dielectric constant, the presence or absence of hydrocarbons, acoustic density, bed boundary, formation density, nuclear density and certain rock characteristics, permeability, capillary pressure, relative permeability, and so on. As one example, this measurement information, produced using instrument 10a, may be used to generate a resistivity image of the borehole 2 or another electrical parameter of interest of a formation 13, and additional instruments 10b and 10c may be used to take nuclear and acoustic measurements in the borehole.

For example, the wireline logging tool may be configured to measure one or more of the following values associated with the formation: (i) a resistivity value, (ii) a density value, (ii) a porosity value, (iii) a natural radiation value, (iv) a borehole image, (v) an acoustic travel time value, (vi) a nuclear magnetic resonance value, (vii) a pressure value, (viii) a well production value, (ix) a residual hydrocarbon saturation value, and (x) a temperature value, and so on. These measurements may be substantially continuous, which may be defined as being repeated at very small increments of depth and/or azimuth, such that the resulting information has sufficient scope and resolution to provide an image of borehole parameters (e.g., properties of the formation at the borehole).

Systems in accordance with the present disclosure may alternatively include a conventional derrick and a conveyance device, which may be rigid or non-rigid, and which may be configured to convey the downhole tool 10 in the wellbore. Drilling fluid ('mud') may be present in the borehole. The carrier may be a drill string, coiled tubing, a slickline, an e-line, a wireline, etc. Downhole tool 10 may be coupled or combined with additional tools. Thus, depending on the configuration, the tool 10 may be used during drilling and/or after the wellbore has been formed. While a land system is shown, the teachings of the present disclosure may also be utilized in offshore or subsea applications. The carrier may include a bottom hole assembly, which may include a drilling motor for rotating a drill bit.

Data acquisition management system 89 receives signals from sensors of the instruments and other sensors used in the system 100 and processes such signals according to programmed instructions provided to the data acquisition system 89. The data acquisition management system 89 may display desired parameters and other information on a display/monitor that is utilized by an operator. The data acquisition management system 89 may further communicate with a downhole control system at a suitable location on downhole tool 10. The data acquisition management system 89 may process data relating to the operations and data from instruments 10a, 10b, 10c, and may control one or more downhole operations performed by system 100.

Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, and/or at a remote location. Moreover, the several components of the hardware environment (or multiple hardware environments) may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

One point of novelty of the system illustrated in FIG. 1A is that the at least one processor may be configured to perform certain methods (discussed below) that are not in the prior art. A surface control system or downhole control system may be configured to control the tool described above and any incorporated sensors and to estimate a parameter of interest according to methods described herein.

Aspects of the present disclosure are subject to application in various different embodiments. In some general embodiments, the carrier is implemented as a tool string of a drilling system, and the acoustic wellbore logging may be characterized as "logging-while-drilling" (LWD) or "measurement-while-drilling" (MWD) operations.

Figure 1B:
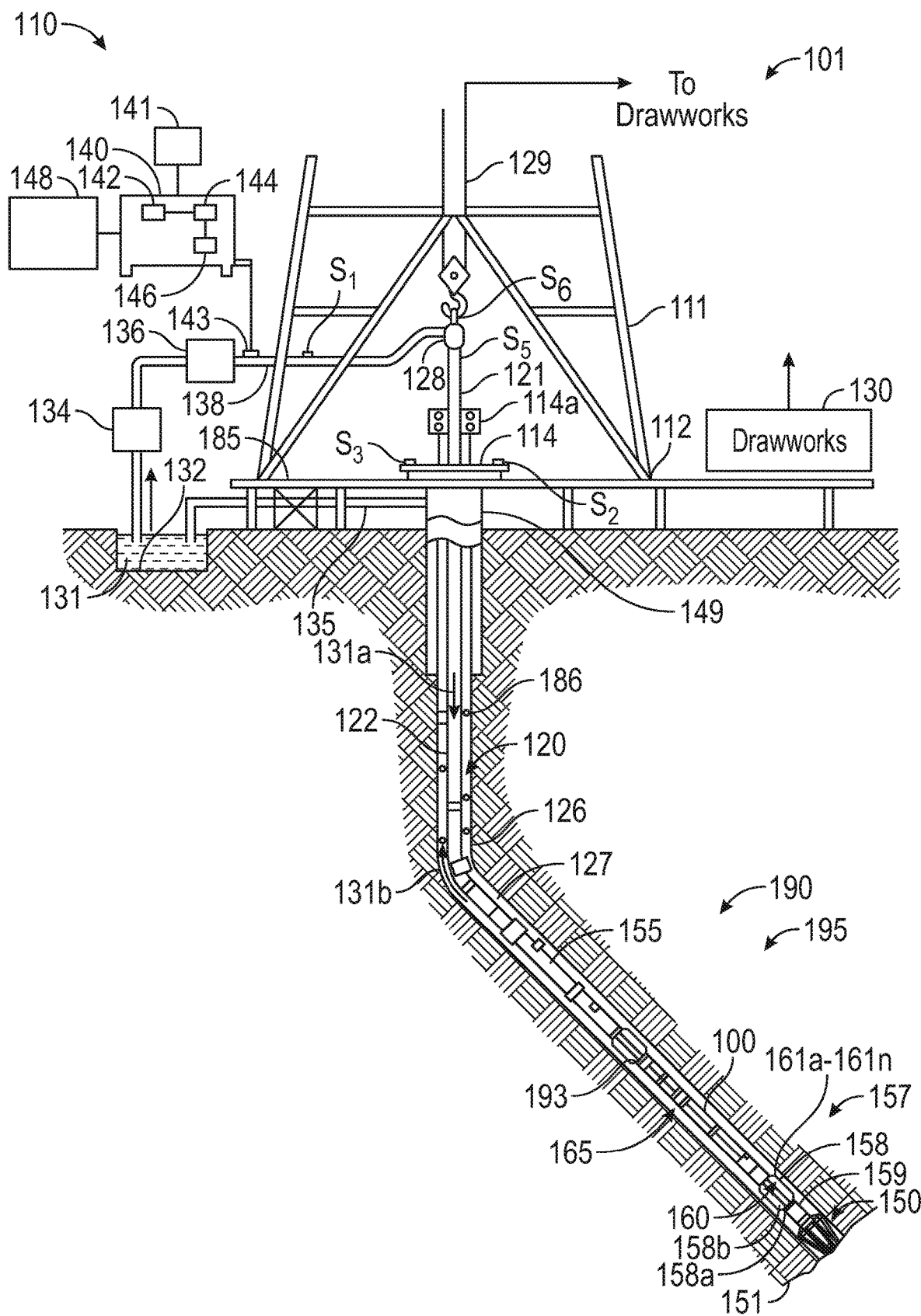
FIG. 1B is a schematic diagram of an example drilling system in accordance with embodiments of the present disclosure.

FIG. 1B is a schematic diagram of an exemplary drilling system 101 according to one embodiment of the disclosure. FIG. 1B shows a drill string 120 that includes a bottomhole assembly (BHA) 190 conveyed in a borehole 126. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

Well control system 147 is placed at the top end of the borehole 126. The well control system 147 includes a surface blow-out-preventer (BOP) stack 115 and a surface choke 149 in communication with a wellbore annulus 127. The surface choke 149 can control the flow of fluid out of the borehole 126 to provide a back pressure as needed to control the well.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form. Thus, surface control unit 140 is analogous in many ways to system 89, as described in FIG. 1A.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165, and include counterparts to sensors described above with respect to FIG. 1A. The BHA 190 may further include a variety of other sensors and devices 159 for determining one or more properties of the BHA 190 (such as vibration, bending moment, acceleration, oscillations, whirl, stick-slip, etc.), drilling operating parameters (such as weight-on-bit, fluid flow rate, pressure, temperature, rate of penetration, azimuth, tool face, drill bit rotation, etc.). For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158a to orient the bent sub in the wellbore and the second steering device 158b to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 190 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES, a G.E. Company, LLC.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. While a drill string 120 is shown as a conveyance device for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 101 may include a bottomhole assembly and/or sensors and equipment for implementation of embodiments of the present disclosure on either a drill string or a wireline.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling parameters, mud parameters, and so on. Control of these devices, and of the various processes of the drilling system generally, may be carried out in a completely automated fashion or through interaction with personnel via notifications, graphical representations, user interfaces and the like. Additionally or alternatively, surface processor or downhole processor may be configured for the creation of the model. Reference information accessible to the processor may also be used.

In some general embodiments, surface processor 142, downhole processor 193, or other processors (e.g. remote processors) may be configured to operate the well logging tool 110 to make well logging measurements. Each of these logical components of the drilling system may be implemented as electrical circuitry, such as one or more integrated circuits (ICs) operatively connected via a circuit board in accordance with techniques of the present disclosure. Each of these control systems may be controlled by actors, such as a remote well operation control host having an operational control relationship established with the drill string.

Figure 2:
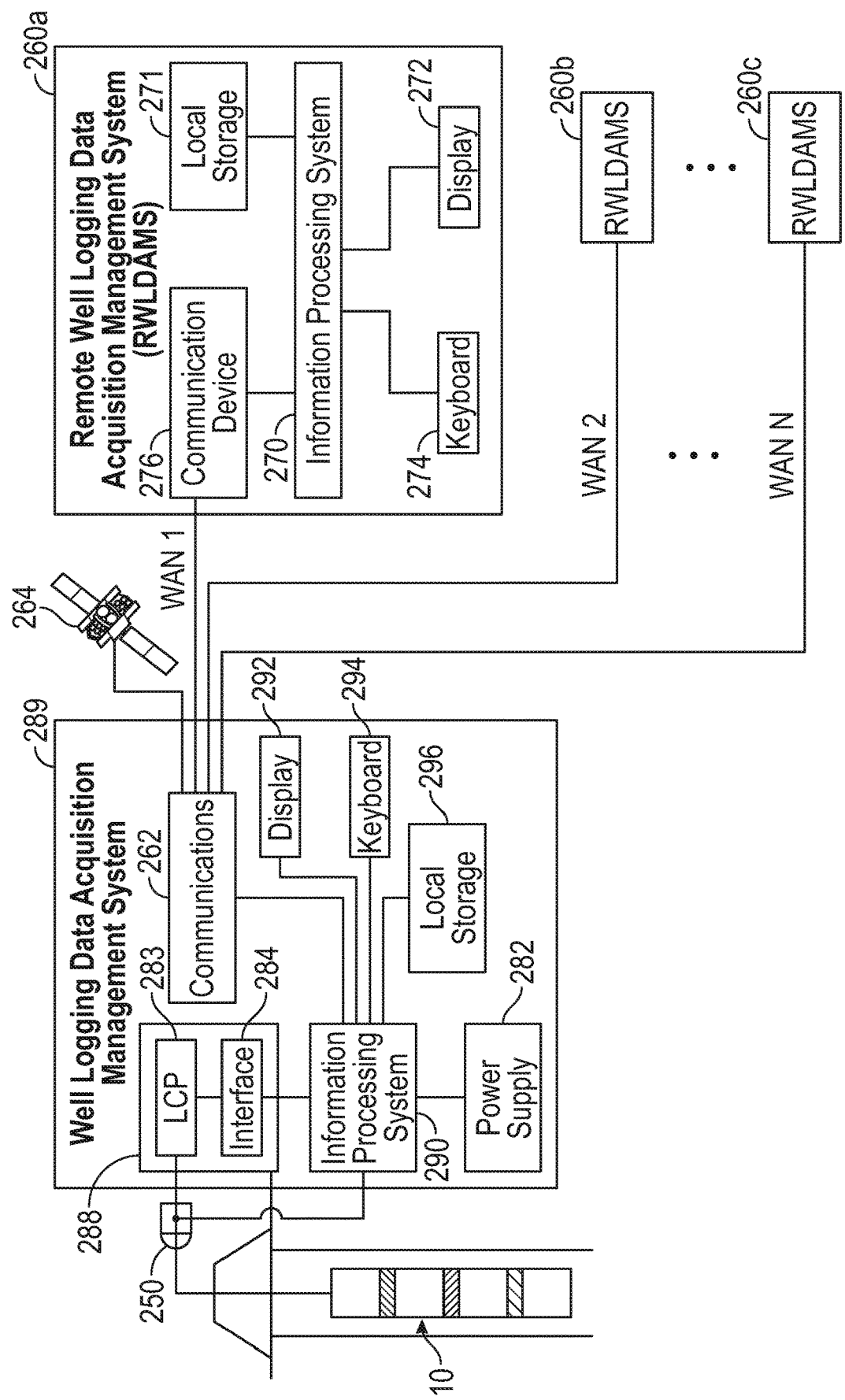
FIG. 2 illustrates a system for remote well logging in accordance with embodiments of the present disclosure.

FIG. 2 illustrates a system for remote well logging in accordance with embodiments of the present disclosure. System 200 includes a local well logging data acquisition management system 289 at the logging site (e.g., local control system), a plurality of remote well logging data acquisition management systems 260a, 260b . . . 260n located at remote locations from the local well logging data acquisition management system 289, several wide area networks (WANs) for networked communication, and a satellite system 264 for dedicated communications.

The local well logging data acquisition management system 289 may be in part a legacy well logging system. System 289 may include a data acquisition system 288 configured to communicate directly with the tool 10 over a data communications cable (e.g., armored wireline cable 14) in ways well known in the art, as well as communications system 262, display 292, input device 294 (e.g., keyboard, mouse, etc), and local data storage 296.

The data acquisition system 288 may include a line control panel and an interface 284. The data acquisition system 288 receives raw logging data from the logging tool 10 via the cable 14 and passes the data to the information processing system 290, which may be implemented as a specially configured industrial computer. The data acquisition system 288 is also configured to receive operational commands from the information processing system 290 and to pass the operational commands to the logging tool 10.

The information processing system 290 is configured to receive commands from remote well logging data acquisition management systems 260a, 260b . . . 260n and to control operation of the logging tool 10 in response to the commands, as well as cooperating with remote well logging data acquisition management systems 260a, 260b . . . 260n to store data remotely, including generation of control signals to induce the communications system 262 to transmit communication signals carrying the acquired raw logging data.

The information processing system 290 is also configured to carry out other processes at the well site, including presentation of representations of raw logging data on display 292, processing of raw logging data according to one or more algorithms to estimate parameters of interest, performing diagnostic tests on components of the system, generation of control signals to induce the power supply 282 to toggle and adjust the supply of power to the logging tool 10 (including cessation of supplying power to the logging tool), and generation of control signals to control movement of the hoist 250 (e.g., to move the tool 10 to a predetermined position, to begin the movement of a logging run, to increase or decrease tension, etc.). The information processing system 290 may also be configured to store logging data in local storage 296, to monitor conditions of WANs and satellite transmissions, and to carry out methods of the present disclosure as described in further detail below.

Each of the remote well logging data acquisition management systems executes its own instance of a remote well operation control host, and the local well operation control host is running on the local well logging data acquisition management system 282, as discussed in greater detail with reference to FIG. 3.

Each of the remote well logging data acquisition management systems 260a, 260b . . . 260n is configured for transmitting well-logging commands to the local well logging data acquisition management system 289 as digital communication signals on a WAN or the satellite system 264 to the well logging data acquisition management system 289, in order to control a first logging instrument 10a, a second logging instrument 10b, or a conveyance device (e.g., cable hoist 250). The remote well operation control host running on information processing system 270 of systems 260a . . . 260n is also configured to receive data via the local well operation control host on the corresponding well logging data acquisition management system at the logging site so as to mirror raw well logging data (from instruments on the tool 10 and acquired by the local well operation control host) to local storage 271. Representations of mirrored data may be presented to a remote well operator on a display 272, and remote subject matter experts at each of the remote well logging data acquisition management systems 260a, 260b . . . 260n may control operations of one of the corresponding instrument by specifying commands using an input device 274 (e.g., keyboard, mouse, etc.).

The information processing system 270 is configured to allow an operator to specify one or more commands (e.g., well operation commands) in substantially real-time in dependence upon raw well logging data received in substantially real-time. The logging data may comprise substantially all the raw well logging data from a particular process (e.g., test), instrument, or substantially including all the raw well logging data acquired locally (including all the raw well logging data transmitted uphole from the tool(s)). A command may comprise any instruction (e.g., input value, or selected value) for controlling well operations at the logging site, including, for example, operation of the logging tool, the hoist device, or the power supply. For example, commands may comprise one or more of the following: (i) an instruction to perform measurement of a specific geological or down hole parameter, (ii) an instruction to actuate a device in the logging tool, (ii) an instruction for moving the logging tool from a first position, (iii) an instruction for applying power to the logging tool or to the hoist device, (iv) an instruction for removing power from the logging tool or from the hoist device, (v) an instruction for modifying measurement parameters utilized by the logging tool and (vi) an instruction for performing a diagnostic test on a computer or the logging tool.

Networked and non-networked communications between well site and remote sites, as well as data acquisition, may be conventionally conducted. See for example, U.S. Pat. No. 7,305,305 to Beeson, U.S. Pat. No. 7,672,262 to McCoy et al., U.S. Pat. No. 6,046,685 to Tubel, U.S. Pat. No. 6,980,929 to Aronstam et al., and U.S. Pat. No. 5,959,547 to Tubel et al., each commonly owned with the present application and incorporated herein by reference in its entirety. See also U.S. patent application publication No.: US 2007/0237402 to Dekel et al., U.S. Pat. No. 6,842,768 to Shaffer et al., and U.S. Pat. No. 6,139,197 to Banks.

In one example, the plurality of remote well logging data acquisition management systems 260a, 260b . . . 260n are located onshore and the local control system 262 can be located on a drilling or production oil rig located offshore. Alternatively, the plurality of remote well logging data acquisition management systems 260a, 260b . . . 260n may be at locations not visible from the local control system 262, such as in different states or countries.

Figure 3:
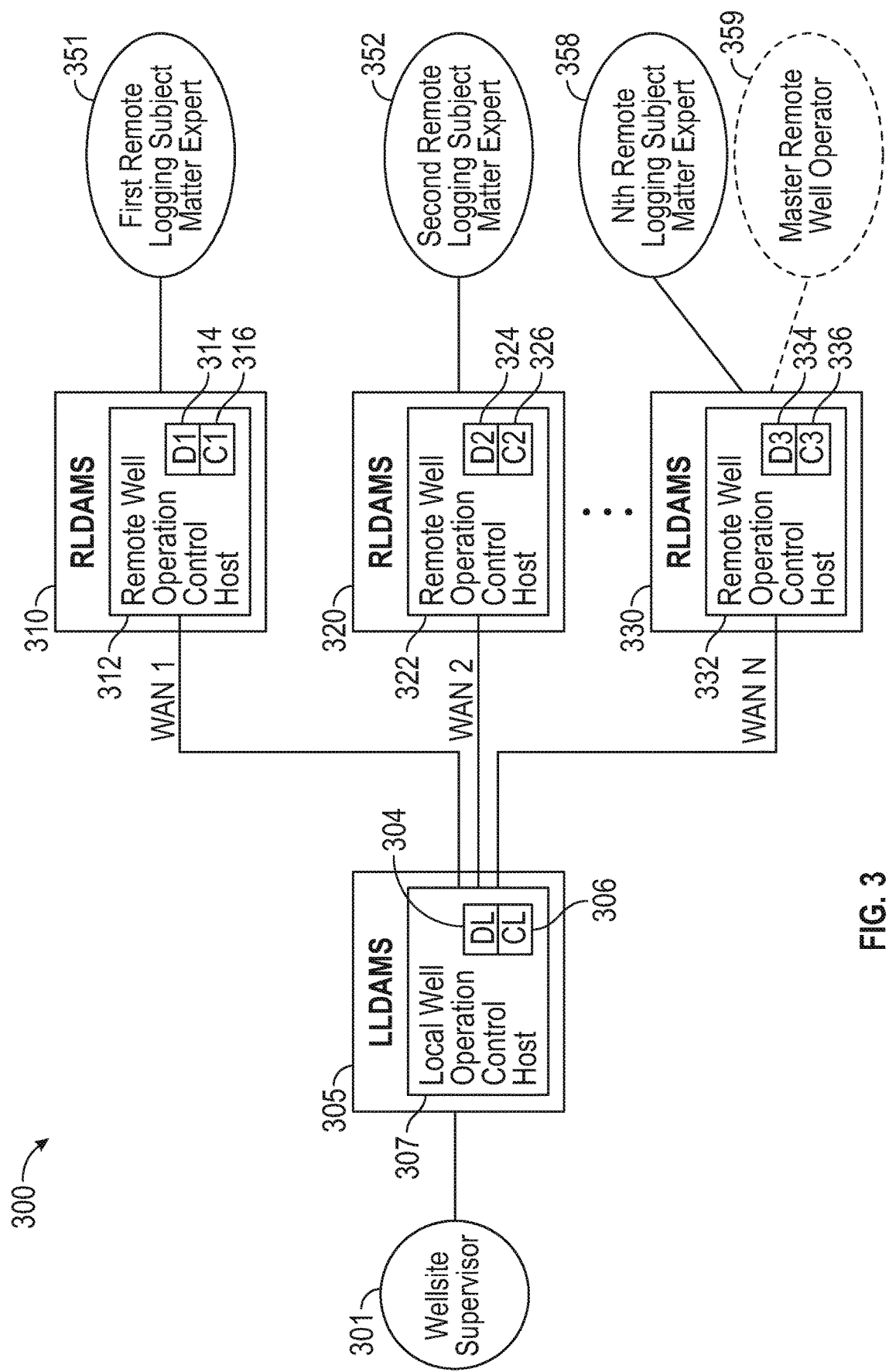
FIG. 3 illustrates a distributed software architecture in accordance with embodiments of the present disclosure.

FIG. 3 illustrates a distributed software architecture in accordance with embodiments of the present disclosure. The system 300 includes a local well operation control host 307 on a corresponding well logging data acquisition management system 305 at the logging site, and a plurality of remote well operation control hosts 312, 322, 332 instantiated and operating on corresponding remote well logging data acquisition management systems 310, 320, 330, respectively. Each instance includes a configurations file 304, 314, 324, 334 with information pertaining to particular instruments, tools, infrastructure, formation, local conditions, operations to be conducted, and so on. The configurations file may be modified at any of the local well operation control host 307 or the plurality of remote well operation control hosts 312, 322, 332 by interaction with personnel at the system or through automated control in response to detected conditions. Each instance also includes links to locally stored copies of raw logging data 304, 314, 324, 334. Each remote well logging data acquisition management system 310, 320, 330 may be specifically configured to conduct operations with respect to particular instruments or logging operations (e.g., services) conducted on a particular instrument, in effect configuring the systems as instrument (or service) control centers.

A first remote well logging subject matter expert(s) 351 may interact with remote well operation control host 312 to conduct well operations relating to a first instrument. For example, the subject matter expert 351 may be a nuclear physicist conducting gamma ray spectroscopy. The local well operation control host or the remote well operation control host may bin recorded gamma rays as a function of the voltage level each gamma ray generates in the measurement instrument. The recorded gamma ray spectrum may then be provided as a function of the channels. The channels in the abstract are not meaningful for gamma ray spectroscopy applications, but become useful if they converted to a representation in terms of energy. Thus, the physicist may map spectra recorded in terms of channels into spectra expressed in terms counts with respect to energy, by finding the relevant peaks with known energy levels and then generating a transfer function based on what channel those peaks are located. The physicist may adjust the gain, gate timing, or other variables of radiation detectors downhole during the measurement operations.

A second remote well logging subject matter expert(s) 352 may interact with remote well operation control host 322 to conduct well operations relating to a second instrument. For example, the subject matter expert 352 may be a resistivity imaging specialist. The specialist may adjust instrument operations, for example, to correct for invasion and shoulder beds, dip, anisotropy, and effects of surrounding beds.

Another remote well logging subject matter expert(s) 358 may interact with remote well operation control host 332 to conduct well operations relating to a third instrument. For example, the subject matter expert 358 may be a borehole acoustic specialist. The specialist may optimize the output power of an acoustic wavetrain emitted from a transducer rotatably mounted in a downhole borehole televiewer for scanning the sidewall of the borehole, in order to prevent destructive interference between the caudal portion of the outgoing wave train and the returning echo signals from the borehole sidewall. This may be accomplished by discretely controlling the amplitude level of the excitation voltage applied to the acoustic transducer.

In embodiments, each of the remote well operation control hosts may be configured to receive all or portions of the raw logging data for all the instruments at the well site. Logging data from additional instruments are often helpful, and in some circumstances may be critical, in adjusting an instrument or interpreting results. In some implementations, the amount of data received from the other instruments may be determined in dependence upon data transfer characteristics of the network, as described in further detail below. Optionally, a master remote well operator 359 may coordinate control of the instruments and the conveyance device by each of the subject matter experts, either through permissions, or communications to each well operation control host.

Figure 4:
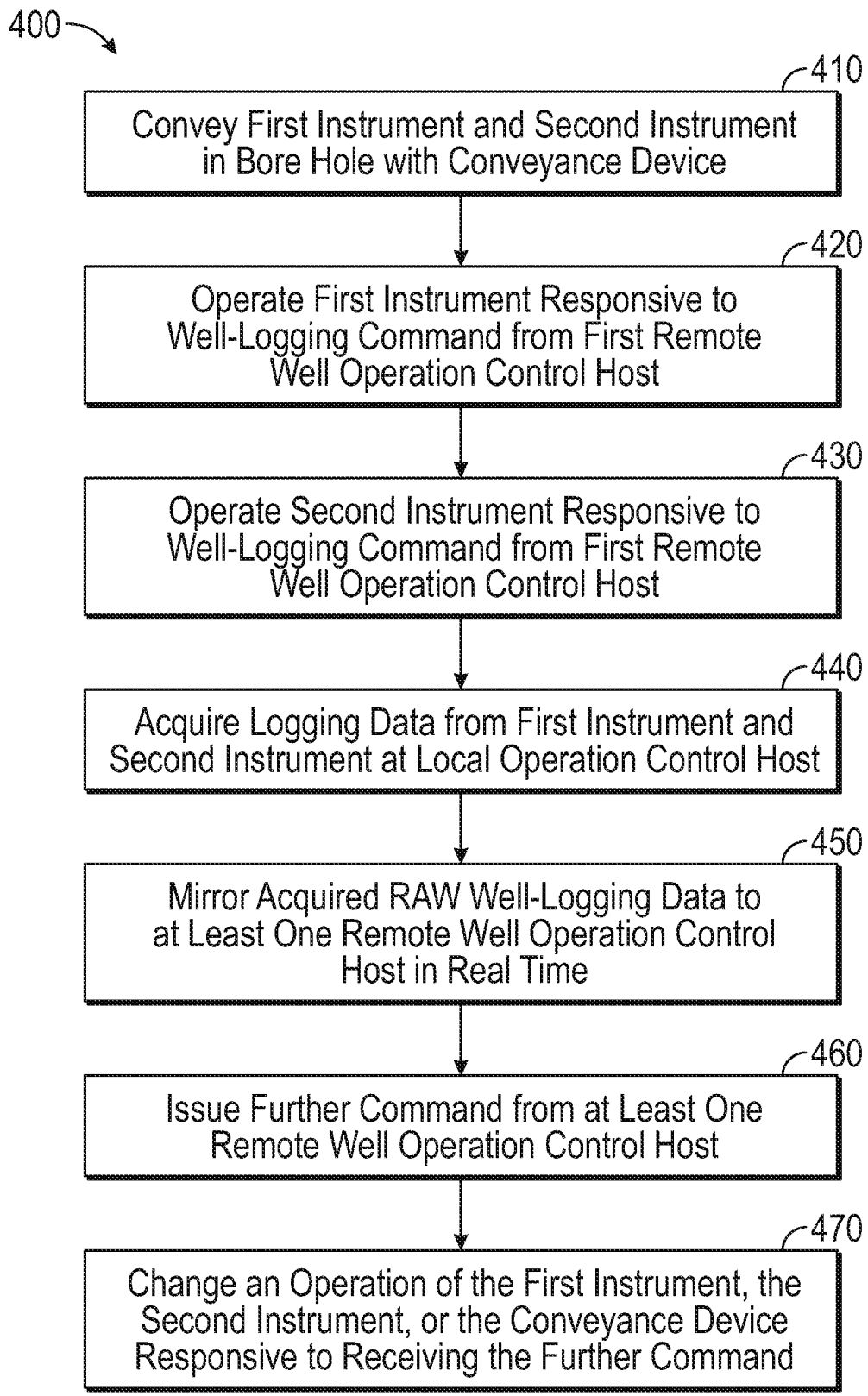
FIG. 4 illustrates methods of remote well logging in accordance with embodiments of the present disclosure.

FIG. 4 illustrates methods of remote well logging in accordance with embodiments of the present disclosure. Method 400 may include conducting, with a plurality of remote well operation control hosts operating on corresponding remote well logging data acquisition management systems, a well logging operation using a well logging system at a logging site, wherein the well logging system includes a conveyance device having disposed thereon a first logging instrument and a second logging instrument.

Step 405 of method 400 may comprise establishing an operational control relationship. This may include establishing an operational control relationship between the carrier and a first remote well operation control host sufficient for the first remote well operation control host to control the carrier responsive to at least one well-logging command from the first remote well operation control host; establishing an operational control relationship between one or more logging instrument(s) and a second remote well operation control host of the plurality; establishing an operational control relationship between one or more logging instrument(s) and a plurality of remote well operation control hosts; or combinations of these. The operational control relationship is sufficient for the second remote well operation control host to control the at least one logging instrument responsive to at least one well-logging command from the second remote well operation control host. Establishing operational control relationships is described in further detail herein below.

Step 410 of method 400 may comprise conveying a first well logging instrument and a second well logging instrument in a borehole using a conveyance device, such as, for example, a tool supported by a wireline cable. Step 420 may comprise operating the first logging instrument responsive to at least one well-logging command from a first remote well operation control host of the plurality; and step 430 may comprise operating the second logging instrument responsive to at least one well-logging command from a second remote well operation control host of the plurality different than the first. Operating the instruments may include, for example, changing a setting on the instrument which affects characteristics of the well logging data produced. In one example, a gain setting of the instrument may be increased or decreased to improve accuracy, resolution, and so on.

Step 440 may comprise acquiring raw well logging data from the first logging instrument and the second logging instrument by a local well operation control host on a corresponding well logging data acquisition management system at the logging site, such as, for example by using the system architecture described in greater detail above. Step 450 may comprise mirroring the acquired raw well logging data to at least one of the plurality of remote well operation control hosts in substantially real time.

In some cases, maximum data resolution or substantially maximum data resolution raw data is needed for analysis of a logged volume. Maximum data resolution refers to the highest sampling speed of the instrument which may be received at the local LDAMS from the tool in substantially real time. Substantially maximum data resolution refers to a data transmission rate for raw tool data at least 95 percent of the maximum data resolution rate. Due to the voluminous nature of substantially maximum data resolution raw data, the tenuous nature of communications over portions of the WAN for particular well sites, and the substantially real-time specifications for this step, raw logging data and system status/controls may be recorded in several local and remote computers and system components may be configured with failover procedures to ensure continuous operation with no data loss under communication interruptions or equipment malfunctions, as described in further detail below. This may be carried out in part by synchronizing the plurality of remote well operation control hosts with the local well operation control host. The logging data at the local well operation control host may be processed identically and in parallel with the logging data at the plurality of remote well operation control hosts and may maintain mirrored sets of control data.

Step 460 may comprise issuing a further command from at least one of the plurality of remote well operation control hosts responsive to the acquired raw well logging data. Methods may include using the logging data to control the logging operation with at least one second command in substantially real-time from the at least one of the plurality of remote well operation control hosts responsive to the logging data received. Step 470 may comprise changing the operation of at least one of the first instrument, the second instrument, and the conveyance device responsive to receiving the further command. The further command may result in toggling an instrument on or off, adjusting gain, adjusting gate settings, adjusting the length of time a tool is energized, reclogging a section of the wellbore, or (in the case of MWD tools) may result in steering the path of the drill bit, stopping drilling, and so on.

Figure 5A:
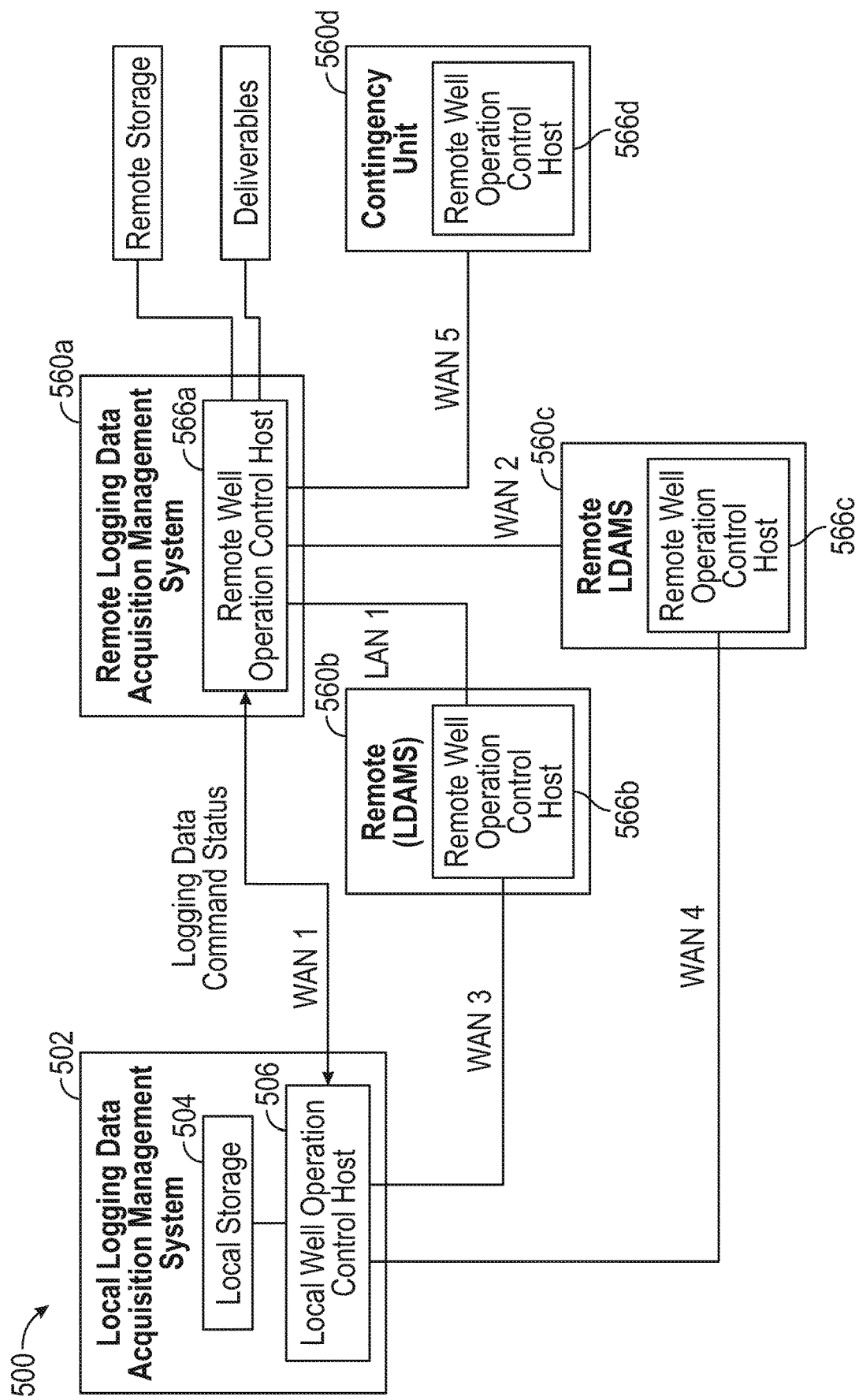
FIGS. 5A-5D illustrate systems for remote well logging in accordance with embodiments of the present disclosure.

FIGS. 5A-5D illustrate systems for remote well logging in accordance with embodiments of the present disclosure. Referring to FIG. 5A, system 500 includes a local well logging data acquisition management system 502 at the logging site (e.g., local control system), a plurality of remote well logging data acquisition management systems 560a, 560b, 560c, 560d located at remote locations from the local well logging data acquisition management system 502 and several wide area networks (WANs) for networked communication.

The local well logging data acquisition management system (local LDAMS) 502 may include local data storage 504. Local LDAMS 502 executes an instance of a local well operation control host 506 for acquisition of well logging data from the well site infrastructure and storage of raw logging data in local data storage 504, connecting with remote well operation control hosts as described above for remote control of logging instruments, and mirroring the raw logging data from local storage to remote well operation control hosts 566 in substantially real time. The local well operation control host 506 may also be configured to monitor conditions of WANs and satellite transmissions, and to carry out methods of the present disclosure as described in further detail below. Each of the remote well logging data acquisition management systems 560a, 560b, 560c, 560d is executing its own instance of a remote well operation control host 566a, 566b, 566c, 566d.

Functionality and responsibilities of various remote well operation control hosts may vary within a system. A first remote well operation control host 566a may function as a master remote well operation control host, which may control carrier operation and assign control of instruments or other logging infrastructure to other remote well operation control hosts 566b, 566c, 566d, etc. In some examples, logging data and/or commands may be routed through the remote well logging data acquisition management system 560a associated with the master remote well operation control host 566a, where the data may be stored and distributed to the other remote well operation control hosts 566b, 566c, 566d, such as, for example, through a LAN connecting the other remote well logging data acquisition management systems 560b, 560c, 560d to the first remote well logging data acquisition management systems 560*a* (and possibly each other). In other examples, each remote well operation control host 566*a*, 566*b*, 566*c*, 566*d* may be fully network connected.

Each of the remote well operation control hosts 566*a*, 566*b*, 566*c*, 566*d* may have a unique function. Example techniques in accordance with embodiments of the present disclosure may include conveying the conveyance device to intersect a volume of interest relating to the first logging instrument via tool commands from a first of the plurality of remote well operation control hosts. Upon the device intersecting the volume of interest, control of the conveyance device may then be assigned from the first of the plurality of remote well operation control hosts to a second of the plurality of remote well operation control hosts. Thus, a team of specialists trained and experienced in finding the volume of interest may operate from a first remote well logging data acquisition management system 560*a* utilizing a first remote well operation control host 566*a*, while individual well operations engineers specializing in measurement operations with the instruments may each operate from other remote well logging data acquisition management systems 560*b*, 560*c* utilizing a specific corresponding remote well operation control host 566*b*, 566*c*. In one example, infrequent and delicate operations, such as, for example, a tool becoming stuck in the wellbore, may be delegated to a contingency unit 560*d* (which may utilize a specially configured remote well operation control host 566*d*), where specialists in contingency actions may alleviate the condition (e.g., a stuck condition of the tool string, kick detection, etc.). Alternatively, control may automatically revert to the local well operation control host 506.

During a logging operation, the local well operation control host 506 operates to transmit substantially all raw well logging data generated by the instruments from the logging site to at least one of the plurality of remote well operation control hosts over a WAN. The local and remote well hosts cooperatively use the logging data to control the logging operation with at least one second command in substantially real-time from the at least one of the plurality of remote well operation control hosts responsive to the logging data received. Aspects of the cooperative functionality of the local and remote hosts are implemented to remedy difficulties arising from the specific context of substantially real-time remote well logging. Connectivity issues make real-time remote well logging problematic. Connectivity issues are also endemic to many of the areas in which remote well logging may be employed. Thus, gracefully handling connectivity issues resulting in insufficient data transfer during remote well operations is critical to providing real-time control of well logging operations.

For example, systems of the present disclosure may implement contingent operational modes to provide failover. Local well operation control host 506, for instance, may determine a value for at least one data transfer characteristic of the WAN with respect to the at least one of the plurality of remote well operation control hosts. Example data transfer characteristics may include metrics corresponding to throughput, downtime, failures, and the like. Local well operation control host 506 may conduct a comparison of the value for the at least one data transfer characteristic with at least one operational sufficiency profile. The contingent operational mode may be implemented in dependence upon the comparison. In other examples, contingency protocols may be implemented for non-data transfer contingencies, such as, for example, emergency conditions as detected from sensor information.

Each operational sufficiency profile may be representative of data transfer characteristic values indicating data transfer sufficient for control of the logging operation in substantially real-time to a standard equal to conventional on-site control. Heuristics, rules, ranges, or thresholds may be used. As one example, if average throughput falls below a first threshold rate for a period of time exceeding a second threshold duration, a contingent operational mode may be triggered. The contingent operational mode may include, for example, i) reducing logging speed; ii) storing logging information at another node; iii) ceding operational control of a logging instrument to a well operation control host local to the logging site; iv) ceding operational control of the carrier to a well operation control host local to the logging site; vi) ceding operational control of a logging instrument to another node; vii) ceding operational control of the carrier to another node; viii) repeating a logging interval; and ix) implementing a change in data compression schemes. Changes in compression schemes may be carried out using a variety of techniques.

In some examples, the implemented contingent operational mode may be selected from a plurality of available contingent operational modes from a configurations file. In embodiments, the contingent operational mode may be implemented in dependence upon an order of priority of at least one of logging data from each logging instrument or operations between each logging operation associated with a particular logging instrument. For example, data from instruments or processes having a lower priority may be pre-compressed prior to compression of the general data stream, or in some cases may be suspended altogether. Priority and criticality data may be stored as a configurations file, determined using heuristics, and so on.

As data transfer slows, receipt of logging data corresponding to one or more services may fall behind real-time. Catch-up of a particular stream of data may be moved up or down in priority (e.g., expedited or delayed, respectively), or forgone in lieu of more recent data, in accordance with the current operational mode. As an example, data from a secondary operation may be cached, and particular segments transmitted when correlated with a segment of interest corresponding to data from another instrument. In some examples, snapshots of downgraded data streams may be forwarded at intervals to conserve bandwidth.

In some instances a proxy (not shown) operating at the well site (e.g., executing on an information processing device shared by the local well logging host or on a system locally networked to the information processing device) is configured to receive commands from remote well operation control hosts 566*a*, 566*b*, 566*c*, 566*d* and to control operation of the logging tool 10 in response to the commands.

Figure 5B:
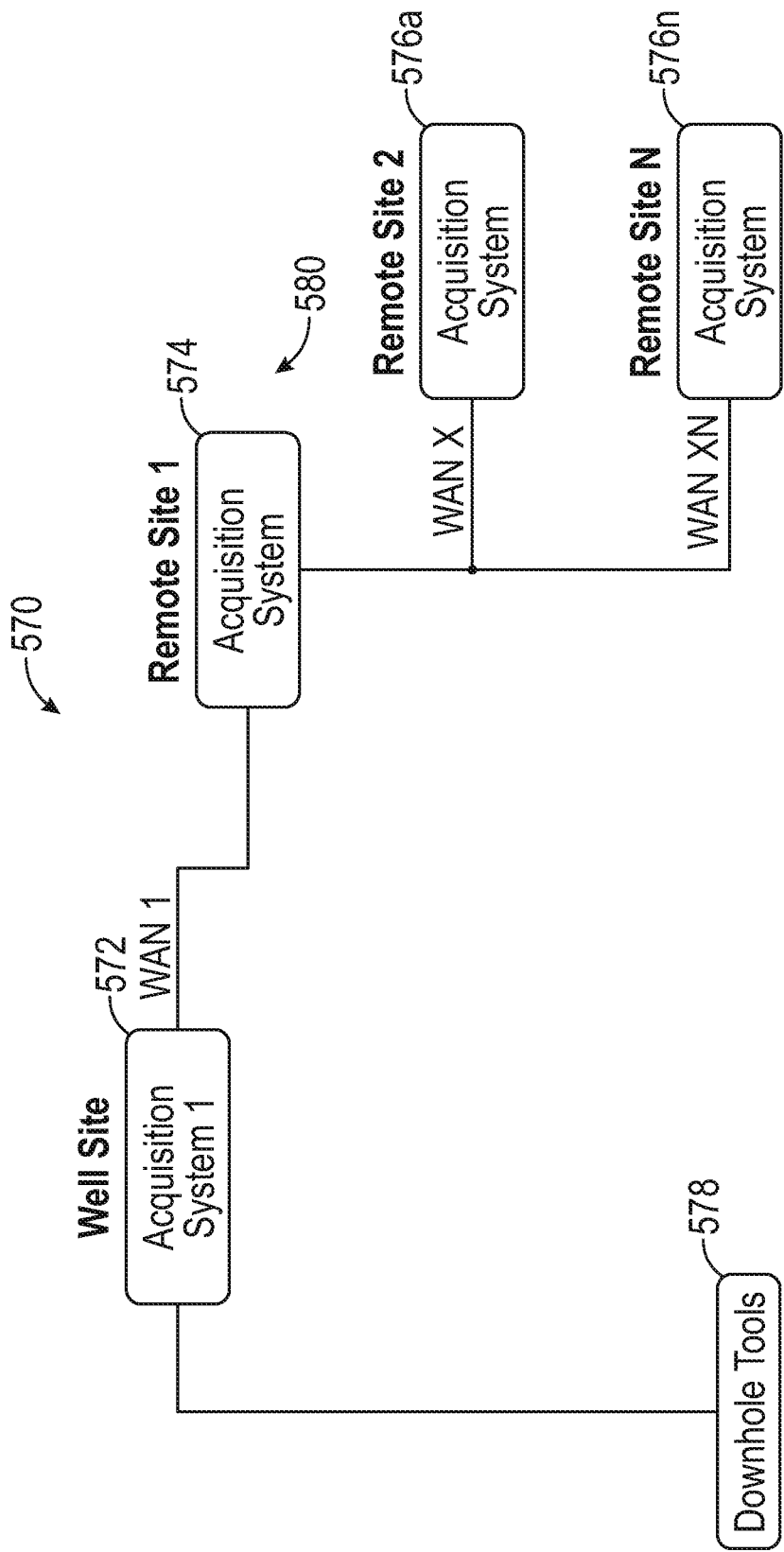

FIG. 5B illustrates another system for remote well logging in accordance with embodiments of the present disclosure. Embodiments described herein above include implementations wherein remote sites are each connected thru individual WAN links directly to the local logging data acquisition management system. However, in some operations, WAN links having broad bandwidths at high reliability (e.g., characteristic to WANs found in a typical city) may not be available.

System 570 features a local logging data acquisition management system 572 connected to a first remote logging data acquisition management system 574, along with additional remote logging data acquisition management systems 576*a* . . . 576*n* connected directly to the first remote logging data acquisition management system 574. In this case, the first remote logging data acquisition management system 574 may be located within a city where reliable large bandwidth networks are commonly available. The first remote logging data acquisition management system 574 may include a first remote well operation control host 580 which may function as a master remote well operation control host similarly to first remote well operation control host 566a (FIG. 5A). This reduces the multi-channel requirements for the local logging data acquisition management system 572 but increases the bandwidth requirements of the WAN link between the first remote logging data acquisition management system 574 and the local logging data acquisition management system 572. To provide the desired degree of redundancy additional WAN links (not shown) could be added in parallel between the first remote logging data acquisition management system 574 and the local logging data acquisition management system 572. Thus, system 570 includes multi-channel WAN capabilities of the local logging data acquisition management system while providing redundancy links useful as contingency data paths should some of the links become interrupted.

As described in greater detail with respect to FIG. 3 above, each remote well logging data acquisition management system may be specifically configured to conduct operations with respect to particular instruments or logging operations (e.g., services) conducted on a particular instrument in logging tool 578, in effect configuring the systems as instrument (or service) control centers. Because each subject matter specialist (or team of specialists) is freed from interacting with subject matter not in his or her area of expertise, the specialist is available to work on other well sites.

Figure 5C:
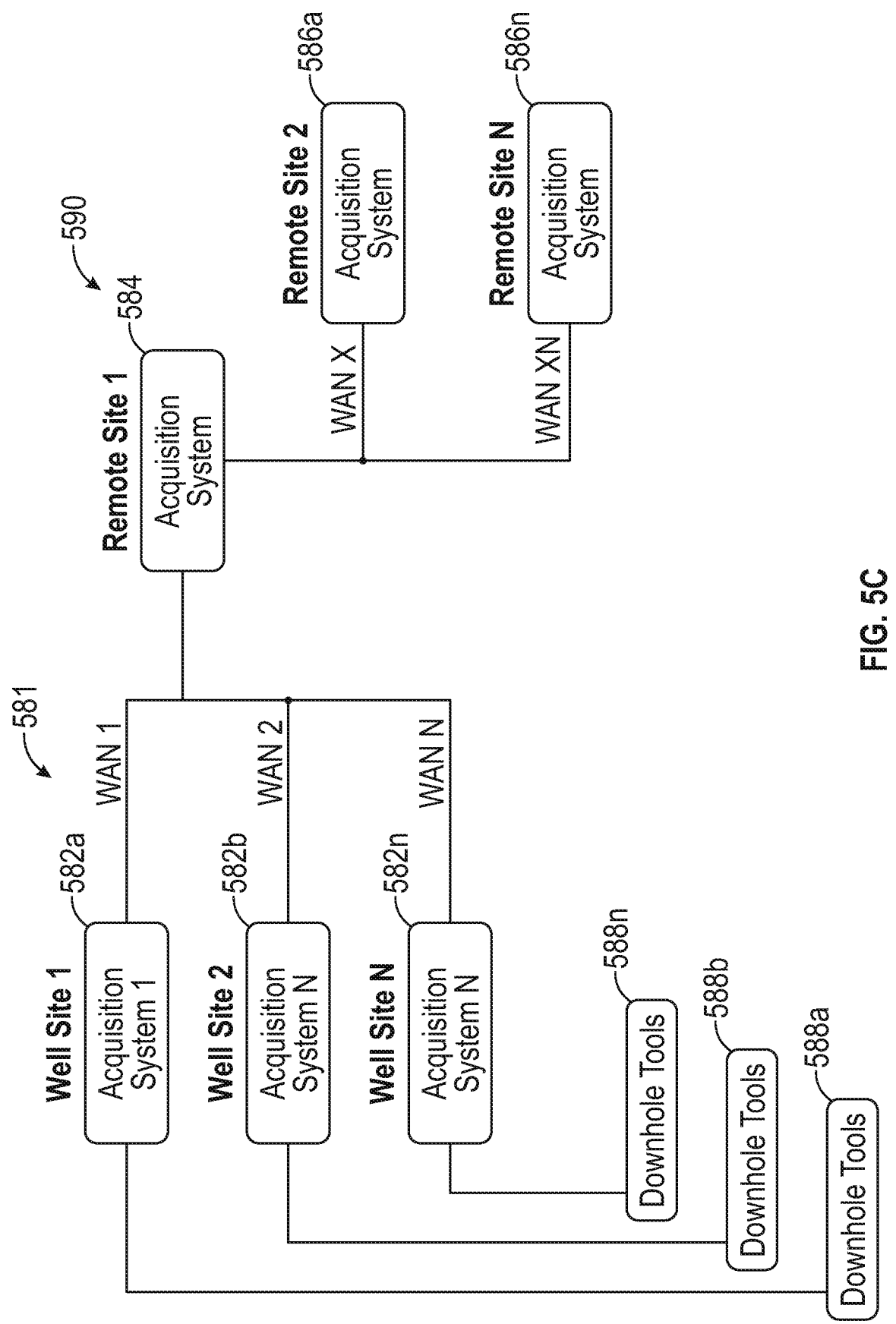

FIG. 5C illustrates another system for remote well logging in accordance with embodiments of the present disclosure. In system 581, multiple logging jobs at different well sites are effectively controlled from multiple remote sites. Each of local logging data acquisition management systems 582a . . . 582n are connected to first remote logging data acquisition management system 584 through individual WANs (WAN1 . . . WANn). In some implementations, multiple parallel WANs may be used to connect any or all local logging data acquisition management systems 582a . . . 582n to first remote logging data acquisition management system 584. Additional remote logging data acquisition management systems 586a . . . 586n are connected directly to the first remote logging data acquisition management system 584. The first remote logging data acquisition management system 584 may include a first remote well operation control host 590 which may function as a master remote well operation control host similarly to first remote well operation control host 566a (FIG. 5A). In any case, control of a particular subsystem, instrument, or logging operation with respect to a tool (588a, 588b . . . 588n) connected to each of local logging data acquisition management systems 582a . . . 582n, respectively, may be distributed to the corresponding subject matter expert at the appropriate additional remote logging data acquisition management system 586a . . . 586n.

In this configuration, one logging expert located in one of the remote sites (e.g., 586a) controls a variety of tools (e.g., 588a, 588b . . . 588n) which may be part of different tool strings being logged at multiple well sites. Although FIG. 5C shows all data traffic passing through the first remote logging data acquisition management system 584, this configuration is only one of many possible configurations which will occur to those of skill in the art in light of the present disclosure, and the logging of multiple well sites may be incorporated in any of the example systems described herein.

Figure 5D:
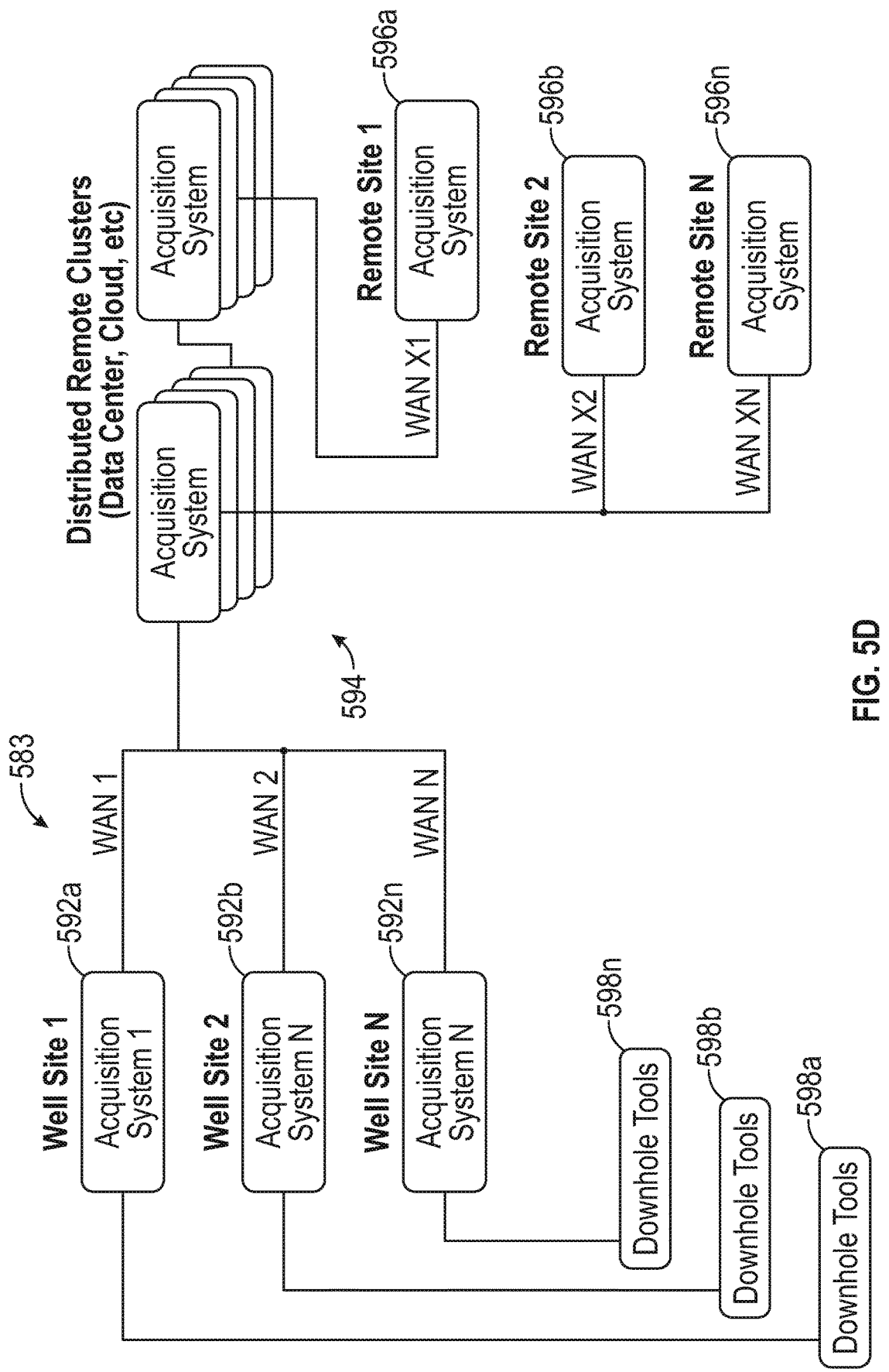

FIG. 5D illustrates another system for remote well logging in accordance with embodiments of the present disclosure. In system 583, multiple logging jobs at different well sites may be effectively controlled from multiple remote sites. Each of local logging data acquisition management systems 592a . . . 592n and remote logging data acquisition management systems 596a . . . 596n are connected to a highly available distributed remote cluster 594, which may comprise one or more data centers or cloud implementations. Distributed remote cluster 594 may be implemented using multiple redundant computing resources in different locations. Clustered resources may be managed through a virtualized master identity. Control of a particular subsystem, instrument, or logging operation with respect to a tool (598a, 598b . . . 598n) connected to each of local logging data acquisition management systems 592a . . . 592n, respectively, may be distributed to the corresponding subject matter expert at the appropriate additional remote logging data acquisition management system 596a . . . 596n. That is, jobs may be routed to a particular system based upon subject matter independent of the well site the data originates from. Thus, jobs from a particular well site may be parsed to operators at many locations, and an operator at a particular location may receive jobs of the same subject matter from various well sites.

Enabling operation of a first logging instrument by the first remote well operation control host and operation of a second logging instrument by the second remote well operation control host may be carried out by using the distributed remote cluster to distribute control capability for a particular instrument to a particular remote well operation control host, by transmitting well logging data from the instruments to the particular remote well operation control host using the distributed remote cluster, and so on.

Although FIG. 5D depicts all data traffic from both ends passing thru a data Center or Cloud type of infrastructure, any possible combination of direct connections to the local wellsite systems, remote systems, and data centers or cloud-based implementations may be employed.

Figure 6:
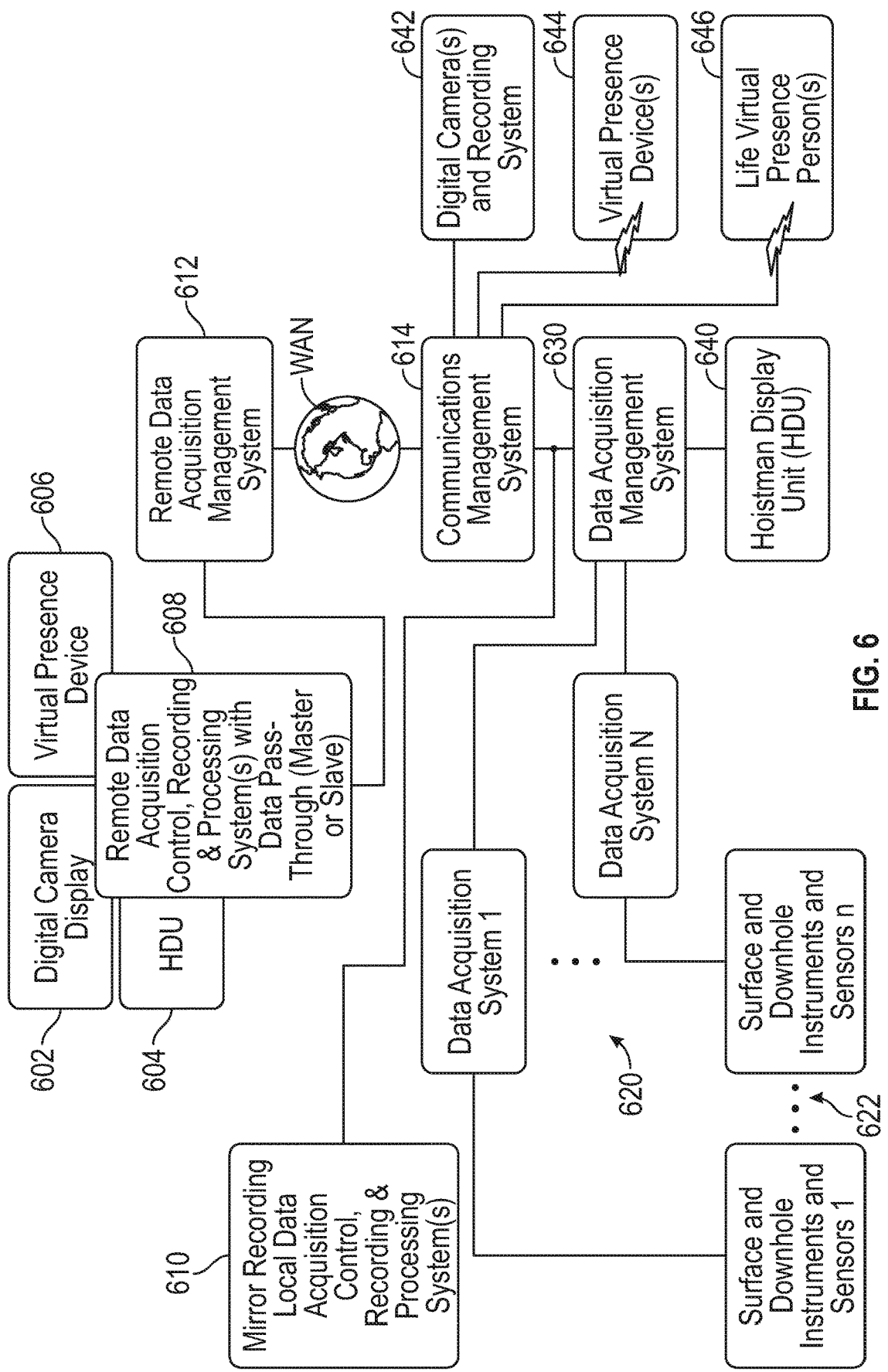
FIG. 6 illustrates another system for remote well logging in accordance with embodiments of the present disclosure.

FIG. 6 illustrates another system for remote well logging in accordance with embodiments of the present disclosure. Surface and downhole instruments and sensors 1 . . . n 622 provide data to data acquisition systems 1 . . . N 620 tailored to interface with corresponding particular tools and data. Data acquisition management system 630 stores data with local system 610 and provides for mirroring the data through communications management system 614 to remote data acquisition management system 612 which stores data to its own local storage and processing system on a network local to the remote data acquisition management system 612. Data acquisition management system 630 also interfaces with hoist device display unit 640.

System 600 further includes enhanced functionality implemented through specialty components. System 600 is configured to use a digital recording system 642 including a digital video camera and associated microphone to transmit with communications management system 614 a virtual presence feed during a logging operation using a Wide Area Network (WAN). The virtual presence feed may include, for example, video information, audio information, gps information, and the like associated with a logging site supervisor from the logging site to at least one of the corresponding remote well logging data acquisition management systems 612. The digital recording system 642 may be incorporated as part of a virtual presence device 644. In some instances, the virtual presence device may be implemented as a personal presence device wearable by the logging site supervisor or other personnel (virtual presence persons 646) or otherwise portable or perspective dependent.

The remote data acquisition management system and/or the remote data acquisition control, recording and processing system may use the virtual presence feed to construct a representation of a virtual presence perspective (e.g., similar to a virtual tour) of the position of the logging site supervisor at the logging site, and present the representation to a remote well operating engineer at the at least one of the corresponding remote well logging data acquisition management systems. In this way, the remote well operating engineer may be able to virtually "stand in the shoes" of the logging site supervisor at the well site. The ability to faithfully recreate visual and auditory cues present at the well site to the remote well operating engineer allows the remote engineer to make faster and more accurate operations decisions based on experience in legacy operations on site.

System 600 may also, during the logging operation, use the Wide Area Network (WAN) to transmit audio instruction data and auxiliary data from the remote well logging data acquisition management system 612 to the logging site. The communications management system 614 (or alternatively, the data acquisition management system 630) may render the audio instruction data as audio instructions via a personal communication system of the logging site supervisor, and render the auxiliary data on a graphic interface of the personal communication system of the logging site supervisor. In this way, the personnel at the well site may be used as a virtual extension of the remote well operating engineer. The remote well operating engineer may make use of the sensory and motion ability of the local personnel through live audio visual contact in order to execute key manual tasks remotely. The audio instruction data may be streamed audio from the well operation engineer or standardized instructions, such as, for example, instructions related to alert conditions or emergencies. Auxiliary data may include step-by-step instructions, excerpts from manuals, maps, simulated control interfaces including guidance indicia, speech-to-text transcripts of the audio, and so on. The simulated control interface may show added text, flags, coloration, or blinking lights to indicate which part of the interface should be interacted with. Auxiliary data may also be overlain on a video feed to provide guidance in a virtual three-dimensional space.

Figure 7B:
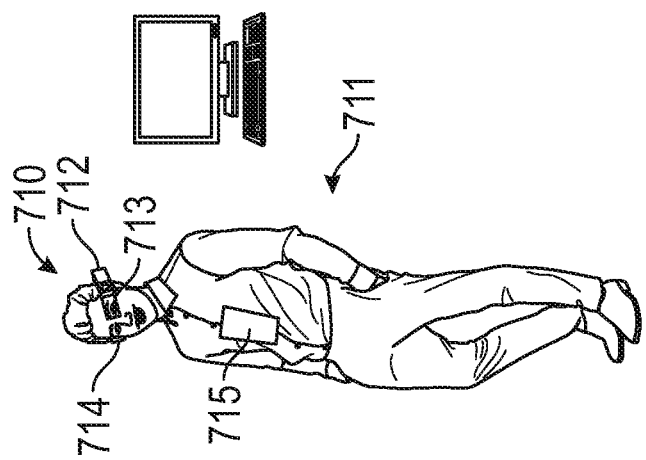
FIGS. 7A-7C illustrate a virtual presence system for incorporation in system embodiments in accordance with the present disclosure.
Figure 7A:
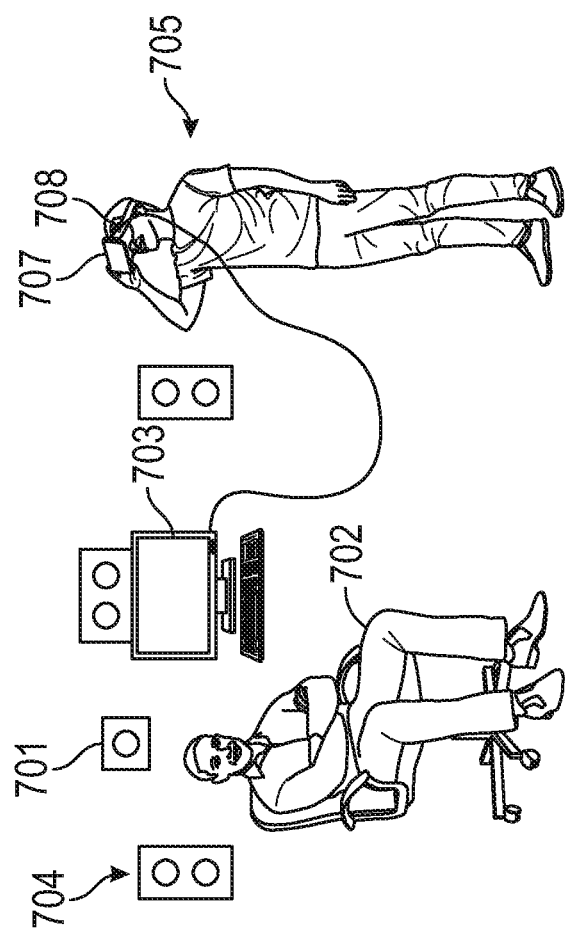
Figure 7C:
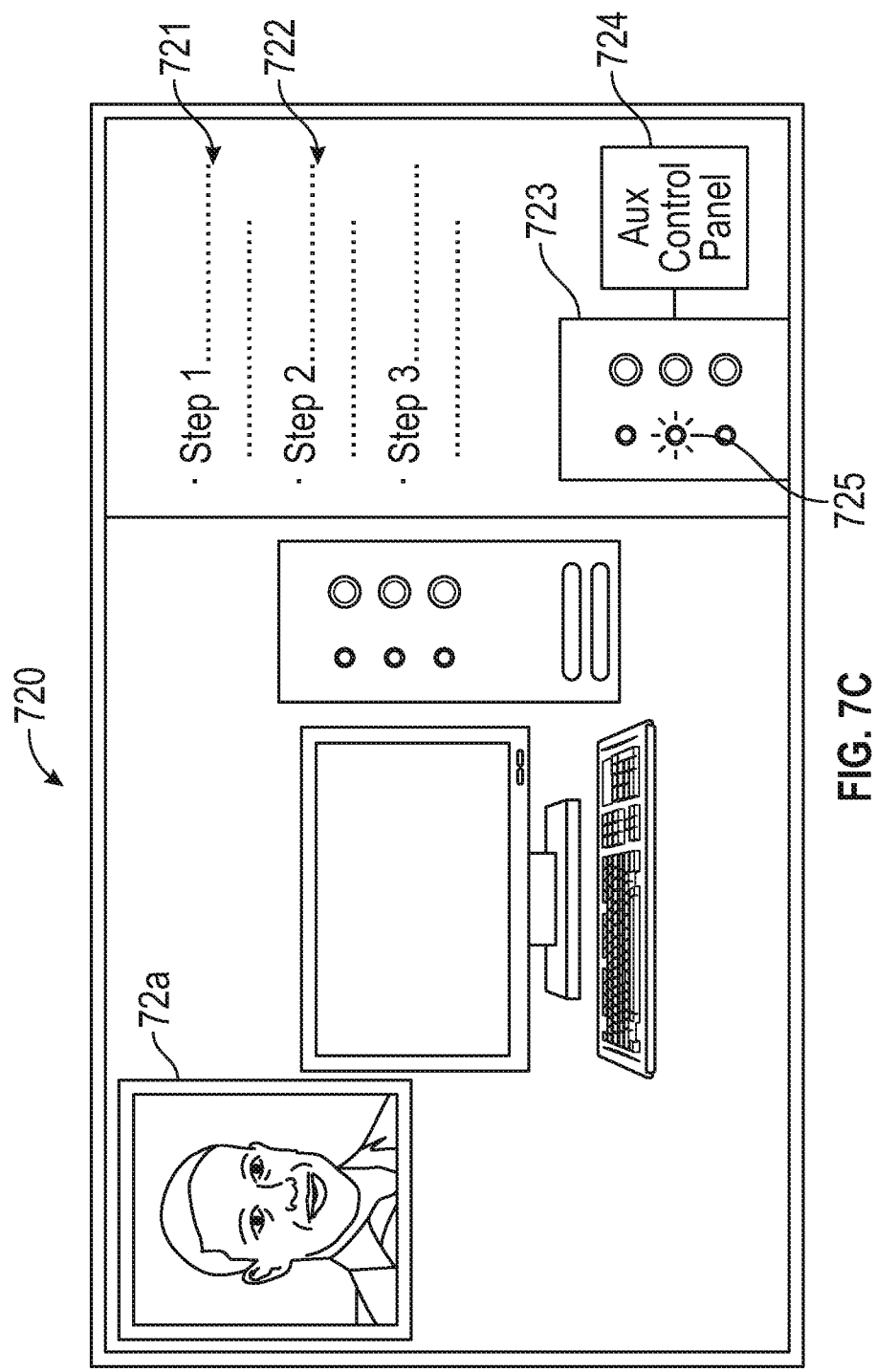

FIGS. 7A-7C illustrate a virtual presence system for incorporation in system embodiments in accordance with the present disclosure. FIG. 7A illustrates virtual presence system components in use at a remote data acquisition management system. The system includes a digital webcam focusing on a first well logging operator 702, who can view video and information from a logging site supervisor (see FIG. 7B, 711) on a display 703, and hear audio on surround speaker system 704. A second well logging operator 705 wears a virtual reality visor 707 and headphones rendering the representation of a virtual presence perspective of the position of the logging site supervisor at the logging site.

FIG. 7B illustrates a personal communication system of the logging site supervisor. The personal communication system 710 includes a heads-up display 713, an eye-level camera 712 corresponding to the field of vision of the logging site supervisor 711, and headphones 714. The personal communication system 710 also includes a wearable microphone 715 which may be attached to a lanyard or shirt.

FIG. 7C illustrates a view of the logging site supervisor 711 on the heads-up display 713 of the personal communication system 710. The heads-up display 720 renders graphical elements on a live video presented on a view screen or on live view through a transparent lens. The graphical elements include an inset video feed 729 of first well logging operator 702, and auxiliary data in the form of virtual panel overlay 721, which includes a list of steps 722 and a simulated control interface 723 including guidance indicia in the form of label 724 and blinking light overlay 725 indicating the physical button to be pressed, known as augmented reality. Fiducial markers applied to equipment may allow an augmented reality system to overlay virtual graphics with instructions over the view.

Audiovisual data and graphical modification of video feeds may be conventionally conducted. See for example, U.S. Pat. No. 9,569,097 to Ramachandran, U.S. Pat. No. 6,223,206 to Dan et al., and U.S. Pat. No. 5,689,641 to Ludwig et al, and U.S. patent application no. 2017/0249745 to Fiala, each incorporated herein by reference.

Well operations comprise a collection of operational processes related to actions or equipment at the local well site. For example, tripping the well may be accomplished through a series of operational processes including actuation of the winch, output of data from depth sensors, strain sensors, and the like, polling of sensors downhole, and so on. Likewise, drilling processes may include optimizing drilling dynamics by controlling rate of penetration, RPM, weight on bit, and other drilling parameters by direct actuation or issuing of control directives, notifications, or alarms in dependence upon output from sensors representative of these parameters. Optimizing a mud program, or operation of particular formation evaluation instruments, may be similarly carried out via a collection of operational processes.

Many processes are typically related to one another. If two processes have no relation, they be said to be mutually exclusive. Other relationships may include sequential relationships, dependent relationships, co-dependent relationships, subordinate relationships, simultaneous relationships, and so on.

The operational processes may be carried out by actors in a control system. Actors may include a computer system, a processor, personnel, and the like. An actor is responsible for operational processes assigned to it. An operational process may also require association of privileges to the actor which enable the actor to carry out the operational process. In a distributed system, various remote actors may have interest in a process. The distribution of control of the process to one or more actors, and the allocation of resources to various processes and/or actors is significantly more challenging than in conventional remote logging scenarios.

Aspects of the present disclosure include establishing an operational control relationship between the carrier and a remote well operation control host sufficient for the remote well operation control host to control the carrier responsive to at least one well-logging command from the first remote well operation control host. In some instances, more than one remote well operation control host may have this relationship (and thus, control the carrier) at various points in time. By controlling the carrier, it is meant that the movement of the carrier is controlled through various processes.

Aspects of the present disclosure include establishing an operational control relationship between selected ones of the at least one logging instrument disposed on the carrier and a remote well operation control host of the plurality, the operational control relationship sufficient for the remote well operation control host to control the at least one logging instrument responsive to at least one well-logging command from the remote well operation control host. This remote well operation control host may be different than the remote well operation control host controlling the carrier. Aspects may additionally include establishing an operational control relationship between selected ones of the at least one logging instrument disposed on the carrier and various remote well operation control hosts, such that two hosts may split time or functionality on a single instrument, and/or a single host may control a plurality of instruments.

In accordance with techniques of the present disclosure, control of and responsibility for each of these operational processes may be implemented by assigning the process to one or more actors and associating privileges required to carry out the process with these actors. Privileges enable control of a resource by the actor via commands and/or access to data from a resource, including (in some cases) virtual presence data. A gateway limits access and control of well resources unless a particular actor has privileges to those resources.

In some cases, failover may be implemented by employing hierarchical privileges. In other cases, privileges may be dynamically assigned to one or more actors in a pool of actors to provide failover. As one example, actors may have credentials associated therewith in a database, and a control system may assign an operational process and grant access to data and control of resources such as a system, component, or computer process (e.g, by establishing a control link, a control session, or other logical control paradigm) associated with the operational process to at least one actor based on the operational credentials of the at least one actor.

Figure 8A:
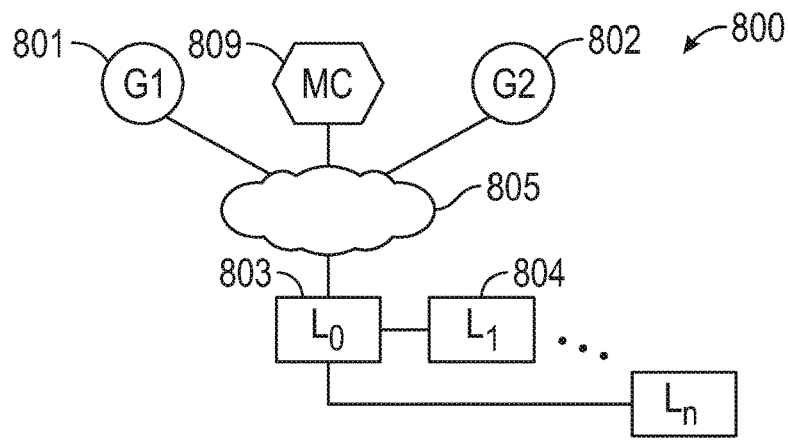
FIGS. 8A-8C illustrate the use of roles in establishing control relationships.
Figure 8B:
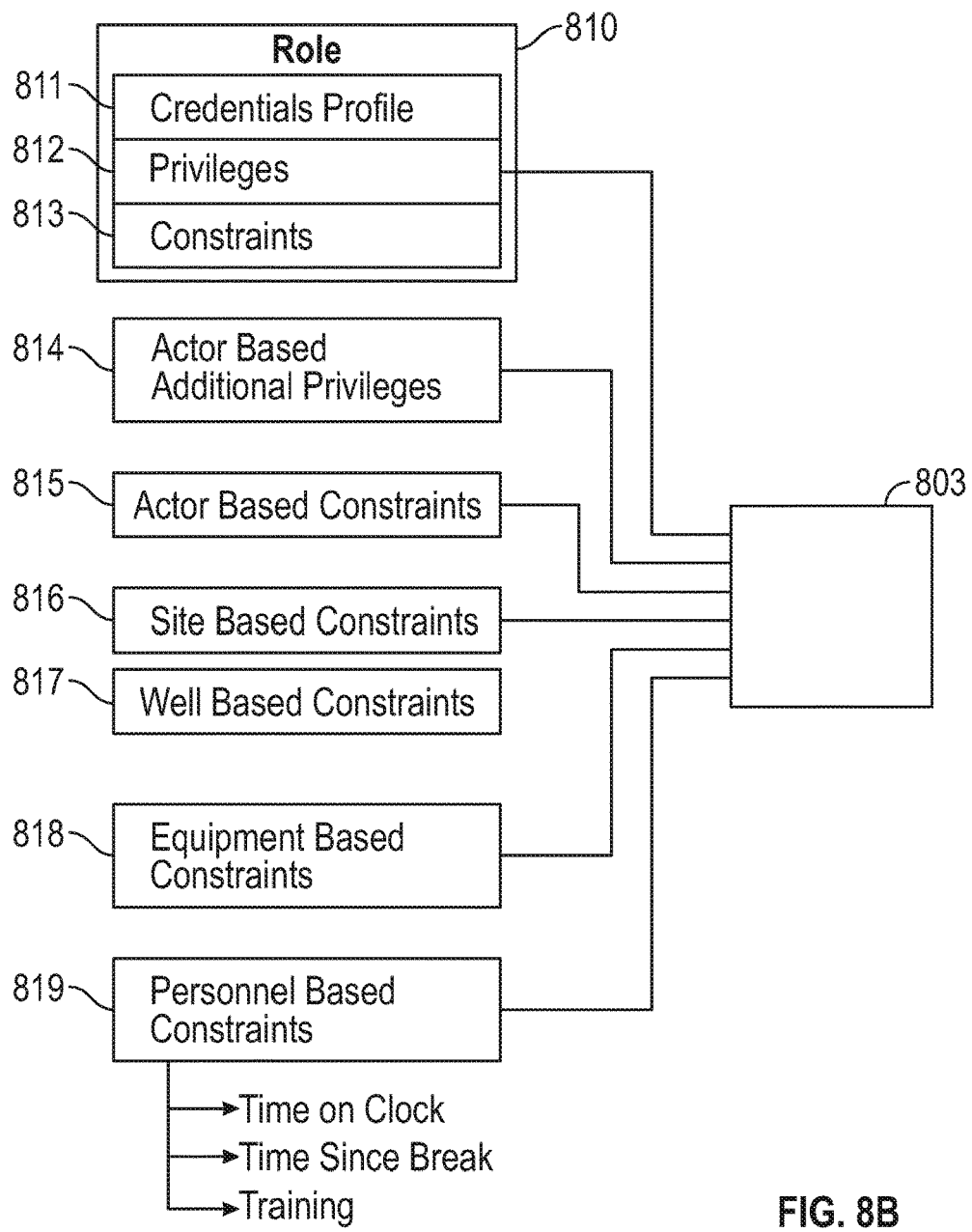
Figure 8C:
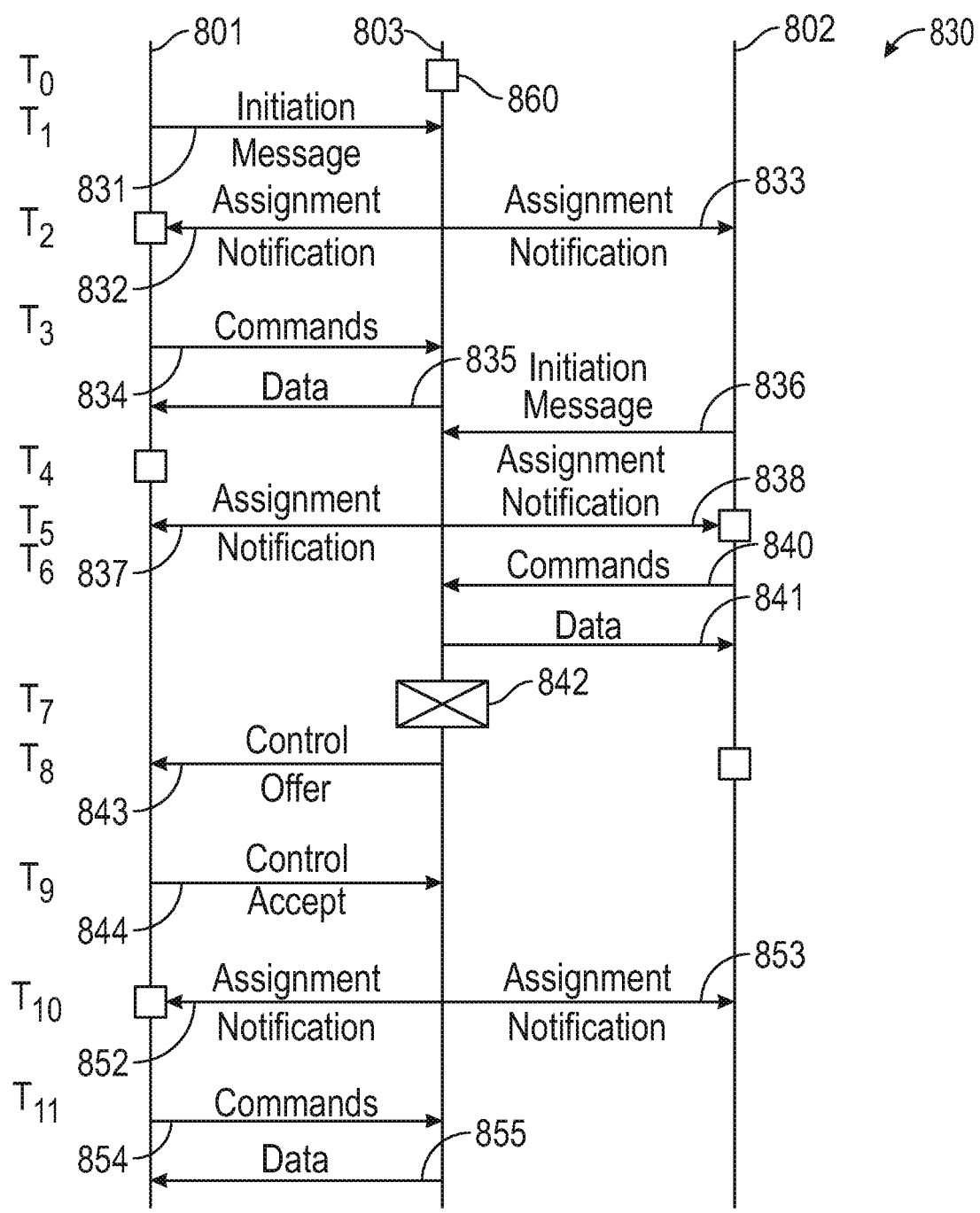

Actors may be associated with roles to establish an operational control relationship with a resource. FIGS. 8A-8C illustrate the use of roles in establishing control relationships. FIG. 8A illustrates a distributed control framework in accordance with embodiments of the present disclosure. FIG. 8A shows a local distribution system $L_0$ 803 connected to local data acquisition systems $L_1 \ldots L_n$ (804), e.g., over one or more LANs. The local distribution system is connected to global control systems $G_1$, $G_2$ (801, 802) by a communication system (805), such as, for example, the Internet. Master control 811 may also be connected to global control systems 801, 802 and local distribution system 803 by communication system 805. Master control 811 may function as a type of "control tower" for operations at a regional or global level, and may be implemented as master remote well operation control host (described in greater detail above) controlled by a system administrator.

Well operations at wells corresponding to local data acquisition systems $L_1 \ldots L_n$ (804) comprise a collection of processes related to actions or equipment at the wells stored as data structures in a database accessible to local distribution system 803. At least some of these processes are assigned to an actor by the local distribution system 803, or by a master control 811. Actors may include a first global control system 801 and a second global control system 802, local data acquisition systems, and the distribution system, as well as personnel at the wells. Local distribution system 803 may also function as a gateway implementing control and data access. Local distribution system 803 implements this control and data access using a control heuristic, as described in further detail below. In accordance with particular embodiments, the control heuristic may be based on privileges and constraints. Other control heuristics may employ context analysis, state analysis, or role analysis as described in greater detail below. A context may be maintained for each operational process comprising a history, a current state, and an objective. The context may also include related operational processes and the relationship. As one example, in a non-emergency situation, if the history of the process indicates control has been changed a threshold number of times, control change may be refused without additional authorization.

All global control systems available or interested in controlling processes at or receiving data from any or all of the wells corresponding to local data acquisition systems $L_1 \ldots L_n$ (804) may transmit an initiation message to the local distribution system 803 notifying their respective status and/or intent. They may also discover each other, and each may communicate to the others a status and intent. A heartbeat comprising a time stamp, globally unique identifier ('GUID'), and status may be transmitted from each actor to the distribution system and other actors (e.g., global control systems). A listing of wells for each distribution system may be maintained in a networked global database and associated with actors indicating interest.

The control heuristic may also incorporate one or more of role-based control and state-based control. A role represents a unique duty to the actor. A state indicates a set of conditions comprising a situational representation, and may apply to the actor, to the well, to the system as a whole, and so on. The utilization of role-based control and state-based control also allows for dynamic failover and load balancing.

Operational thresholds of a variety of types may be stored in a database, either based on particular instances of actors, or in relation to a class of actors. Each threshold may have an associated remedy. As any one actor exceeds an operational threshold, the distribution system implements the remedy. As one example, if an operating engineer has worked more than a threshold amount of time without a break, the operational process assigned to him may be reassigned to another engineer at another workstation, and possibly at another remote work operation control host. The role of the particular engineer and the particular workstation replacing the operating engineer may be modified to grant privileges to carry out the assigned operational process. Associations between actors, roles, privileges and the like may be implemented using various data structures and other techniques known in the art, including databases, metadata, reference tables, pointers, and tags.

In some cases, control may be implemented by employing hierarchical roles. In other cases, roles may be dynamically assigned to assign and transfer control as needed. As one example, actors may have roles associated therewith in a database, and a control system may assign an operational process and grant access to data and control of a system, component, or computer process associated with the operational process based on the role. Roles may be shifted or modified in dependence upon detection of events, upon context, or by request from an actor or from a master control. Some roles may have privileges to access data, without control of the resource (e.g., an instrument). Some roles may have limited control of the resource, while other roles may have universal control of the resource. Roles may include control of related instruments or of the movement of the tool string, or of mechanical devices downhole.

Likewise, some roles may receive one level of data access, while another role receives a second, lesser or different level of data access. For example, the sampling rate of delivered instrument data, the bandwidth at which data is delivered, and the type of data delivered may all vary with respect to role.

Methods of well control operations in accordance with embodiments of the disclosure may include implementation of a role based control structure. For example, a control system may assign an operational process and grant access to data and control of a system, component, or computer process (e.g, by establishing a control link, a control session, or other logical control paradigm) associated with the operational process based on roles. Roles may be associated with an actor.

Use of any service, system or component at the well, along with shared services such as power, position or velocity of the tool, bandwidth on the system bus, or bandwidth on the WAN may be considered a resource. Methods of well operations control in accordance with embodiments of the disclosure may include allocating control of well operations resources. This may be carried out by allocating at least one resource at a well to a process, distributed sharable resources to a plurality of processes, or allocating resources to a combination of process and remote actor.

A resource may have associated with it in a database, a configurations file, or the like, a set of one or more operational profiles. The operational profiles may be dependent upon (e.g., associated with) a set of current processes, actors associated with the processes, states, and so on. As one example, a bandwidth sharing profile for the modem of an external gateway of a remote logging data acquisition management system may indicate the bandwidth allotted to each process in fractional or absolute terms (or a combination of the two) as a function of the active processes and the total projected bandwidth available. When a new process is initiated, a logical rule may cause selection of an alternative profile which deprecates the bandwidth allotted to the previous processes and allots bandwidth to the new process in accordance with the alternative profile. A higher priority level associated with the new process than is associated with the previous processes may result in switching to a profile allotting a majority of the available bandwidth to the new process.

Figure 9A:
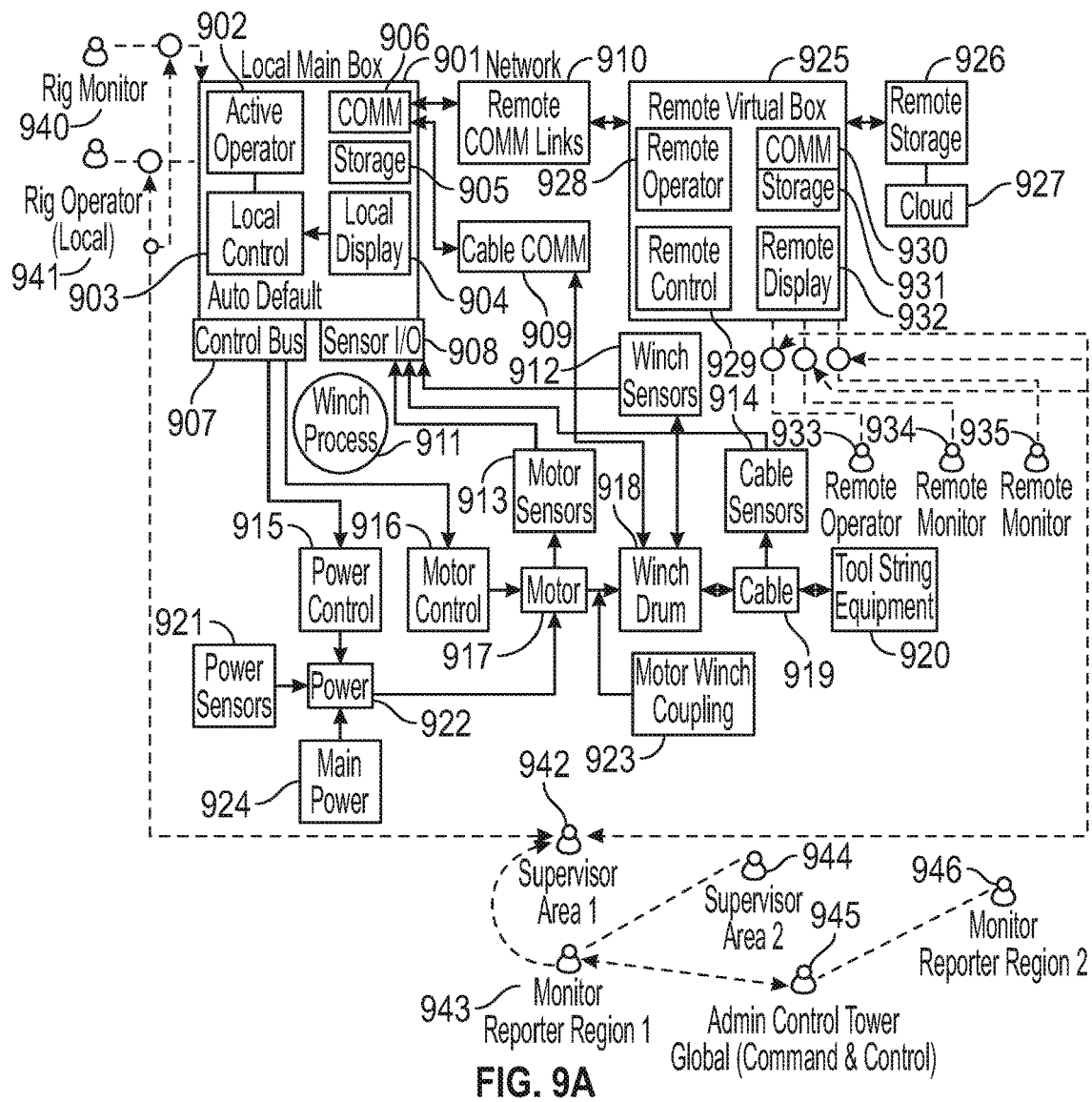
FIGS. 9A & 9B illustrate control relationships between actors and resources.
Figure 9B:
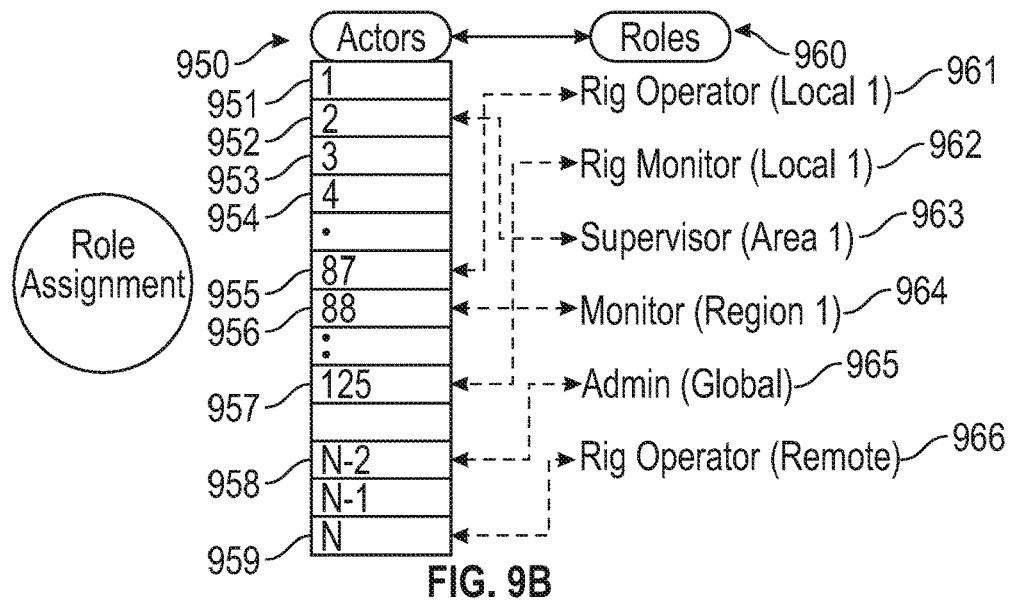

FIGS. 9A & 9B illustrate control relationships between actors and resources. It should be noted that an actor may also be a resource. FIG. 9A describes a functional block diagram for a winch process. The winch process is controlled locally by a local main box 901, which contains various functional modules such as an active operator 902, communication 906, data storage 905, local control processor 903, local display 904, control bus 907, sensor input and output channels (I/O) 908, and auto default setup. The winch system provides power and supports communication between the local main box 901 and the tool string equipment via the deployment cable for example (or, alternatively, by coiled tubing, pipe conveyed log, drill string, slick line, wireline, EM telemetry, etc.).

The basic winch system functionality contains modules main power 924, power module 922, power sensors 921, power control 915, motor control 916, motor 917, motor winch coupling 923, winch drum 918, and cable sensors 914. The local main box COMM module 906 provides communication in conjunction with the cable communication module 909 for further communication with the tool string equipment via the winch cable 919. The COMM module 906 communicates with the distributed network via the remote communication link network resources 910. The figure shows an example of a distributed network connection with a remote virtual box 925 which is a virtual mirror image of the local main box for remote logging control and operations associated with distributed remote roles and functions. The remote virtual box functional block diagram contains a remote operator 928, a COMM 930 and STORAGE module 931, remote control processor 929, remote display 932, and is connected to a remote storage module 926 associated with a cloud-based distributed network storage system 927.

These distributed control systems associated with the local main box 901 and remote virtual box 925 can each be controlled concurrently in multiple ways by fully automated algorithms, by a man-machine interactive semi-automated mode, or fully man-controlled operation. Control functions may be associate with multiple operational roles (e.g. rig operator, rig monitor, and so on) and corresponding tasks may be allocated to multiple actors. These actors-roles assignments are hierarchically controlled and may be implemented along with a control switch. The actors can be locally or remotely located. The remotely located roles can be organized into global, regional, areas and local groups.

The role assignment process may establish an operational control relationship between processes and actors using an actor-role association in a data structure, as shown in FIG. 9B. Actors 950 are associated (dashed lines) with roles 960. Example roles include local rig operator (local) 961, rig monitor (local) 962, supervisor (area) 963, monitor reporter (region) 964, administrator (master control) 965, remote operator (remote) 966. These roles are assigned to Actor 87 (955), Actor 125 (957), Actor 2 (952), Actor 88 (956), Actor n−2 (958), and Actor n (959), respectively. Actor 1 (951), Actor 3 (951), and Actor 4 (951), among others, are not assigned roles in this process. The actor-role association can be carried out in dependence upon scheduling constraints, such as, for example, an actor time schedule constraint, actor maximum task capacity workload allowed, role assignment expertise and certification requirements, and so on.

Similarly, actors can be a component of a system (e.g., equipment) which can have its assignment shifted based on working conditions, availability, optimum equipment specifications, actor-to-role task requirements fit, project prioritization of tasks and goals, schedule and safety optimization via equipment-to-actors assignments, etc. Each of these characteristics may be parameterized and appropriate values of the parameters associated with actors, such as, for example, stored in a relational database as credentials. An actor (e.g., a remote well operational control host) may be identified and selected for association with privileges in dependence upon a comparison of the credentials and the credentials profile. It may include selecting the remote well operational control host in dependence upon the comparison. This may be carried out using a selection heuristic, which may comprise a set of selection rules. As one example, effective bandwidth of data transfer to the remote host may be balanced against the experience rating in the particular instrument or operation of the available personnel on duty at the remote host, the availability of archived data at the remote host, technical specifications, and so on, in accordance with the credentials profile. Roles may be associated with a credentials profile. The selection rules may be implemented as weighted combinations of credential values, stepwise logical decision trees, or other logical rules. The selection rules may comprise part of the credentials profile. As one example, see the example decision rule rendered in pseudocode below.

Form Set1=ReturnAll ((Rhost:PING)=True)
Form Set2=ReturnGreatest (Set1:Experience:JobTag1132, 10)
Form Set3=ReturnAll ((Set1:Distance( ))<200)
Form Set4=ReturnAll ((Set1:EffBand( ))>1300)
IF ReturnTrue(Set2 AND Set3 AND Set4)=NOT %
Select (ReturnGreatest (Set1:Experience:JobTag1132, 1)
ELSE
Select (ReturnGreatest (Set1:EffBand( ))

The rule represented by the code above searches for all interested remote hosts, then determines those having the top ten in experience at the desired job. Another set of remote hosts is found within 200 kilometers. Another set of remote hosts is created using bandwidth of over 1.3 GHz. If any remote hosts are in each group, the ReturnTrue, will not return an empty set, and the remote host associated with the best experience is selected. If no host is in all three groups, the interested host having the highest effective bandwidth is selected.

Figure 10:
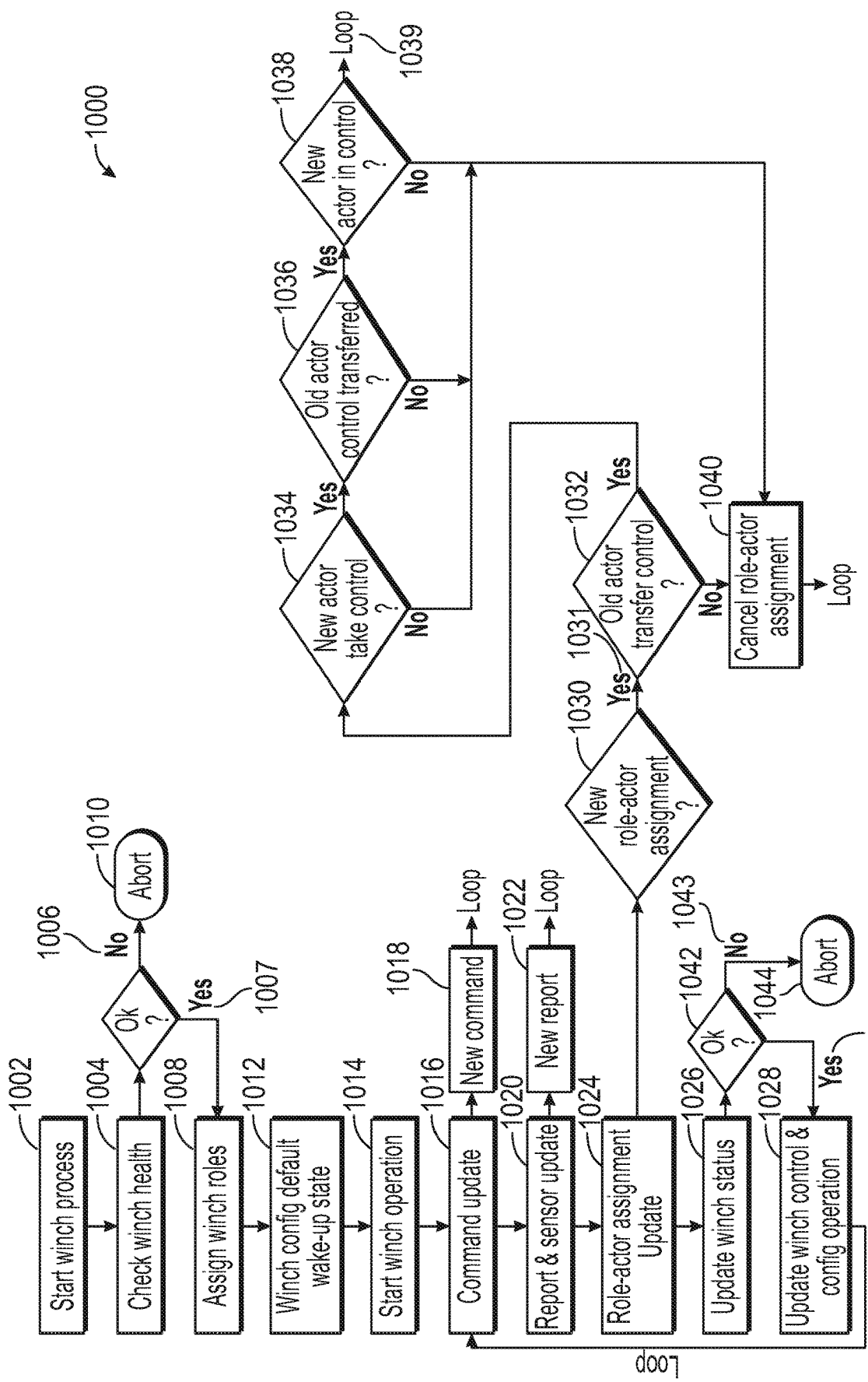
FIG. 10 shows a flow chart illustrating an example of incorporation of role switching into a winch control operational process in accordance with embodiments of the present disclosure.

FIG. 10 shows a flow chart illustrating an example of incorporation of role switching into a winch control operational process in accordance with embodiments of the present disclosure. The winch starts its operational process (1002) and self-checks its health condition (1004). If there are operational health issues (1006) the winch operation process is aborted (1010). If the winch health is OK (1007) the winch proceeds to operation. Roles are initially assigned (1008) and the winch takes a default wake-up state configuration (1012). The winch starts its operation (1014) and waits to receive a command. Whenever a command is received (1016) from an actor having privileges to the winch (e.g., by being associated with a role having privileges), the new command is activated (1018) and the winch proceeds to its repetitive normal operating loop executing the current command until completed or a new command is received (1018). Next the winch performs a report and sensor update (1020) and sends a report (1022) with its operational state, data conditions, sensor data, and so on to nodes stored in a configurations file, e.g., to the network monitoring supervisory roles. Next the winch process checks for a role-actor assignment update (1024) for its control functions. If a new control actor-role assignment is issued (1030) its role-actor connection algorithm is initiated, which may identify the availability of the actor and the availability of the role in the present operational context. Upon capture of a new role-actor assignment, the old actor may be consulted if it can and will transfer role control (1032). If yes (1031) the process continues to consult with the new actor and determines if and when the new actor is available, and if new actor can and will take role control (1034). If yes (1039), control handover is carried out, including verification the old actor has transferred role control (1036) and the new actor has assumed control (1038). If yes the new actor is confirmed to be in the new role control. If any of these four hand-shake verifications result in a NO the new role-actor assignment is cancelled. Next, the winch state status is verified (1026) and if the status check fails (1043), the winch process is aborted (1044) and shut down under a safe pre-defined procedure. If the status check is positive (1045), the winch process continues to update its execution control sequence and operation configuration based on the role switch (1028), and then returns to waiting for a command update.

Returning to FIG. 8B, methods of well operations control in accordance with embodiments of the disclosure may include allocating control of a well operations resource at a well by allocating at least one resource to a remote actor in dependence upon a role associated with that actor. Roles 810 may be stored as data structures in a data base, and may be associated with a credentials profile 811 representing the credentials required to fulfil the role, a set of privileges 812 that are granted with the role, and a series of constraints 813 acting on the role. The role data structure may be accessible (e.g., through operative connection to a local copy of a database) by the local distribution system 803. Actors may be associated with roles. Optionally, or alternatively, local distribution system 803 may allocate resources by using actor based privileges 814, actor based constraints 815, site based constraints 816, well based constraints 817, equipment based constraints 818, personnel based constraints 819, and so on. The local distribution system 803 may allocate resources based on a combination of these items by using heuristics comprising a collection of rules.

In some embodiments, well operations control (such as, for example, well logging control, well drilling control, well casing installation control, well stimulation control) may include allocating control of at least one well operations resource at a well, comprising allocating control of the at least one well operations resource to a local controller while in a default state; and changing from the default state by allocating control of the at least one well operations resource to a remote actor in dependence upon a role associated with the remote actor. The well operations resource may be a logging resource. This may include determining a state of the resource and/or a state of the logging site, and allocating the resource in dependence upon the role and the state(s). In some cases, the credentials of an actor may be compared against the credential profile of the role, either by distribution system 803 or master control 809, and a role may be dynamically associated with the actor in dependence upon the comparison.

FIG. 8C shows a data flow diagram illustrating the communication between global control systems and a distribution system to change control of an operational process over time. The process control is shown by the token 860, which represents the role of operator. At a first time, T0, the distribution system 803 has control of the operational process, and thus assumes the role of operator. At T1, a first global control system 801 with appropriate credentials that is in contact with the distribution system 803 initiates a role switch with an initiation message 831 to the distribution system. In some implementations, the message may additionally, or alternatively, be sent to a second global control system 802 with appropriate credentials that is in contact with the distribution system 803. The distribution system 803 assigns the role of operator to global control system 801 at T2 by sending assignment notification 832 to global control system 801 and assignment notification 833 to global control system 802. Global control system 801 assumes command of the process in response to the message 832 at T3, and sends commands 834 and receives data 835, such as, for example, formation evaluation sensor data.

At T4, the second global control system 802 attempts to change roles to assume control of the process by sending a control request, which may be in the form of initiation message 836 to the distribution system 803. In some schemes, the control request may take a different form than the initiation message. The distribution system performs a handshake procedure to determine if the second global control system 802 make take control. The handshake procedure may use a set of rules to determine an outcome based on the role, the actors, related roles of the actors, the state of the process or a related process (e.g., complete, mid-measurement, between measurements), equipment state (arm extended, tool position), constraints, and other priority information. The second global control system 802 wins the handshake and distribution system 803 assigns the role of operator to global control system 802 at T5 by sending assignment notification 837 to global control system 801 and assignment notification 838 to global control system 802. Global control system 802 assumes command of the process in response to the message 838, and sends commands 840 and receives data 841 at time T6.

Allocating resources may be carried out by triggering a role modification in response to detecting a role shift event; identifying at least one actor associated with the role modification, and modifying the role of the at least one actor. Role shift events may include safety alarms, equipment failure, kick detection, security breaches, loss of connection with the controlling actor (e.g., loss of heartbeat), a role switch initiation from an actor, a role switch initiation from master control, detection of a state linked with a particular actor not in control, detection of a state proscribed for the current actor, or combinations of these. The role shift event may also be triggered by process activities dependencies and process activities constraints. The role of the at least one actor may be modified to a new role including privileges to the resource. As one example, a role shift event may comprise detection of the tool reaching a target volume of interest for an instrument on the tool string for which another actor has more compatible or higher priority credentials.

At T7, a role shift event 842 is detected by distribution system 803, which triggers a role modification. In response to the detection, distribution system 803 sends a control offer 843 to global control system 801 at T8. At T9, global control system 801 accepts the offer by sending a control accept message 844.

The distribution system 803 assigns the role of operator to global control system 801 at T10 by sending assignment notification 852 to global control system 801 and assignment notification 853 to global control system 802. Global control system 801 assumes command of the process in response to the message 852 at T11, and sends commands 854 and receives data 855. When global control system 801 is finished it may release control or offer to release control, either to distribution system 803 or to other actors.

As described above, the distribution system may control access to data from the tool string. This control may be implemented by routing only the data appropriate for consumption to a particular host or client. Alternatively, control may be implemented by using different dictionaries, encryption, or other security measures for data intended for an actor having a first level of privileges than for other data intended for another actor having a second level of privileges different than the first level. For example a different encryption key may be used for each level of privilege or each actor. This may be particularly useful in system embodiments employing a distributed remote cluster (see FIG. 5D).

Techniques for obtaining EM propagation measurements (e.g., relative phase and attenuation) are well known in the art. See for example, U.S. patent application Ser. No. 13/991,029 to Dorovsky et al. and U.S. patent application Ser. No. 15/280,815 to Kouchmeshky et al., each incorporated herein by reference.

Acoustic beam reflection may be conventionally processed to detect azimuthal thickness of multiple tubulars (e.g., production tubing, first and second casing, etc.) as well as position, cement thickness, borehole diameter, bond quality, and so on. See, for example, U.S. Pat. No. 7,525,872 to Tang et al., U.S. Pat. No. 7,787,327 to Tang et al., U.S. Pat. No. 8,788,207 to Pei et al., U.S. Pat. No. 8,061,206 to Bolshakov, U.S. Pat. No. 9,103,196 to Zhao et al., and U.S. Pat. No. 6,896,056 to Mendez et al., each commonly owned with the present application and incorporated herein by reference in its entirety.

Methods include generating an electromagnetic (EM) field using an EM transmitter of the logging tool to produce interactions between the electromagnetic field and a volume of interest. Evaluation of the resulting measurements may be carried out in accordance with techniques known to those of skill in the art. See, for example, U.S. Pat. No. 7,403,000 to Barolak et al. and U.S. Pat. No. 7,795,864 to Barolak et al., each incorporated herein by reference in its entirety.

The tool may include a body (e.g., BHA, housing, enclosure, drill string, wireline tool body) having pads extended on extension devices. Two to six pads may be used. The extension devices may be electrically operated, electromechanically operated, mechanically operated or hydraulically operated. With the extension devices fully extended, the pads may engage the wellbore 580 and make measurements indicative of at least one parameter of interest of the earth formation or wellbore infrastructure (e.g., casing). Such devices are well-known in the art. See, for example, U.S. Pat. No. 7,228,903 to Wang et al., hereby incorporated by reference in its entirety.

U.S. Pat. No. 8,055,448 B2 to Mathiszik et al., having the same assignee as the present disclosure and the contents of which are incorporated herein by reference, discloses further improvements in MWD acoustic imaging. A downhole acoustic logging tool is used for generating a guided borehole wave that propagates into the formation as a body wave, reflects from an interface and is converted back into a guided borehole wave. Guided borehole waves resulting from reflection of the body wave are used to image a reflector. U.S. Pat. No. 8,811,114 B2 to Geerits et al., having the same assignee as the present disclosure and the contents of which are incorporated herein by reference, discloses further improvements in MWD acoustic imaging.

The volume of interest may be a plurality of nested conductive tubulars in the borehole, and estimating the property may be carried out by estimating a property corresponding to at least one tubular (and possibly all) of the plurality of nested conductive tubulars. The property corresponding to each conductive tubular may include at least one of: i) location of the tubular; ii) thickness of the tubular; and iii) at least one property of a defect of the tubular; iv) a presence of a completion component outside at least one tubular; and v) a property of a completion component outside at least one tubular.

The term "substantially real-time" as applied to methods of the present disclosure refers to an action performed (e.g., estimation, modeling, processing, and so on) while the sensor is still downhole, after the generation of the information and prior to movement of the sensor an appreciable distance within the context of evaluating the borehole or formation at an associated resolution, such as, for example, a distance of 50 meters, 25 meters, 10 meters, 5 meters, 1 meter, 0.5 meters, 10 centimeters, 1 centimeter, or less; and may be defined as estimation of the parameter of interest or production of the current iteration of a model within 15 minutes of generating the information, within 10 minutes of generation, within 5 minutes of generation, within 3 minutes of generation, within 2 minutes of generation, within 1 minute of generation, or less. Substantially simultaneously as applied to methods of the present disclosure refers to actions performed (e.g., estimation, modeling, processing, and so on) with overlap of the first and second action (simultaneously), or an amount of time not greater than a time after an end of the first action and prior to movement of the instrument an appreciable distance within the context of evaluating the borehole or formation at an associated resolution, such as, for example, a distance of 50 meters, 25 meters, 10 meters, 5 meters, 1 meter, 0.5 meters, 10 centimeters, 1 centimeter, or less; and may be defined as estimation of the parameter of interest or production of the current iteration of a model within 15 minutes of the end of the first action, within 10 minutes of the end of the first action, within 5 minutes of the end of the first action, within 3 minutes of the end of the first action, within 2 minutes of the end of the first action, within 1 minute of the end of the first action, or less. Substantially all means enough data to maintain the benefit of maximum resolution, such as at least 90 percent of the data over an interval, at least 95 percent of the data over an interval, at least 98 percent of the data over an interval, at least 99 percent of the data over an interval, up to an including 100 percent of the data.

Methods may include conducting further operations in dependence upon the property. The further operations may include at least one of: i) geosteering; ii) drilling additional wellbores in the formation; iii) performing additional measurements on the formation; iv) estimating additional parameters of the formation; v) installing equipment in the wellbore; vi) repairing infrastructure; vii) optimizing present or future development in the formation or in a similar formation; viii) optimizing present or future exploration in the formation or in a similar formation; and ix) producing one or more hydrocarbons from the formation.

Aspects of the present disclosure include systems and methods for formation evaluation, such as performing well logging in a borehole intersecting an earth formation, as well as casing integrity inspection. "Well logging," as used herein refers to the acquisition of information from a downhole tool located in a borehole, whether the borehole is cased or open, during or after the formation of the borehole. The information may include parameters of interest of the formation, the borehole, infrastructure installed in the formation (e.g., casing, production tubing, etc.), downhole fluids in one of these, or combinations of the same. Drilling systems in accordance with aspects of the present disclosure may have a plurality of "logging-while-drilling" ('LWD') or "measurement-while-drilling" ('MWD') instruments as part of a bottomhole assembly. Operational processes may include computer processes (e.g., applications or routines), physical processes (pulling a lever), telemetry, monitoring (e.g., outputting sensor data), control, actuation, chemical processes, and the like.

Embodiments may include, during a logging operation, using a Wide Area Network (WAN) to transmit raw logging data from the logging site to a receiving node at at least one of: i) the first instrument control station; ii) the second instrument control station; iii) the well operation control host; iv) a data processing system remote from the logging site; v) a display station remote from the logging site; and vi) a data archiving system remote from the logging site. The data may be transmitted in substantially real-time.

While the foregoing disclosure is directed to the one mode embodiments of the disclosure, various modifications will be apparent to those skilled in the art. It is intended that all variations be embraced by the foregoing disclosure.

What is claimed is:

1. A method of remote well operation control, the method comprising:
conducting, with a plurality of remote well operation control hosts operating on corresponding remote well logging data acquisition management systems, a well logging operation using a well operation system at a well site, wherein the well operation system includes a carrier having disposed thereon at least one logging instrument, comprising:
establishing a first operational control relationship between the carrier and a first remote well operation control host of the plurality of remote well operation control hosts sufficient for the first remote well operation control host to control the carrier responsive to at least one well-logging command from the first remote well operation control host;
establishing a second operational control relationship between a selected one of the at least one logging instrument and a second remote well operation control host of the plurality different than the first, the operational control relationship sufficient for the second remote well operation control host to control the at least one logging instrument responsive to at least one well-logging command from the second remote well operation control host and receive logging data;
using a Wide Area Network (WAN) to transmit substantially all well logging data generated by the selected one of the at least one logging instrument from the well to at least one of the plurality of remote well operation control hosts; and
using the logging data to control the well operation with at least one second command in substantially real-time from the at least one of the plurality of remote well operation control hosts responsive to the logging data received;
wherein the first remote well operation control host of the plurality and the second remote well operation control host of the plurality are each remote from the well site.

2. The method of claim 1, comprising:
operating the carrier responsive to at least one well-logging command received from the first remote well operation control host of the plurality; and
operating the logging instrument responsive to at least one well-logging command received from the second remote well operation control host of the plurality.

3. The method of claim 2, further comprising, over at least one interval of time, identically processing the logging data at a local well operation control host in parallel with processing the logging data at the second remote well operation control host, substantially simultaneously.

4. The method of claim 1 further comprising operating a second logging instrument responsive to at least one well-logging command from the second remote well operation control host.

5. The method of claim 1 further comprising operating a second logging instrument on the carrier responsive to at least one well-logging command from a third remote well operation control host of the plurality different than the first and second.

6. The method of claim 1 comprising wherein the carrier comprises at least one of i) a drill string; ii) a wireline; and iii) a downhole tool.

7. The method of claim 1 wherein the well operation comprises at least one of: i) geosteering; ii) drilling at least one borehole in a formation; iii) performing measurements on a formation; iv) estimating parameters of a formation; v) installing equipment in a borehole; vi) evaluating a formation; vii) optimizing present or future development in a formation or in a similar formation; viii) optimizing present or future exploration in a formation or in a similar formation; ix) producing one or more hydrocarbons from a formation; x) performing maritime logging operations of a seabed.

8. The method of claim 1, further comprising:
conducting, with the plurality of remote well operation control hosts operating on the corresponding remote well logging data acquisition management systems, a second well operation using a second well operation system at a second well remote from the first well, wherein the second well operation system includes a second conveyance device having disposed thereon a third logging instrument and a fourth logging instrument, comprising:
- establishing a third operational control relationship between the third logging instrument and the first remote well operation control host sufficient for the first remote well operation control host to control the third logging instrument responsive to at least one well-logging command from the first remote well operation control host;
- establishing a fourth operational control relationship between a fourth logging instrument and the second remote well operation control host, the operational control relationship sufficient for the second remote well operation control host to control the fourth logging instrument responsive to at least one well-logging command from the second remote well operation control host.

9. The method of claim 8 further comprising enabling
i) operation of the carrier by the first remote well operation control host,
ii) operation of the selected one of the at least one logging instrument by the second remote well operation control host,
iii) operation of the third logging instrument by the first remote well operation control host, and
iv) operation of the fourth logging instrument by the second remote well operation control host,
by:
using a master remote well operation control host, of the plurality of remote well operation control hosts, on a corresponding remote well logging data acquisition management system to establish the third operational control relationship and the fourth operational control relationship.

10. The method of claim 1 further comprising enabling operation of the carrier by the first remote well operation control host and operation of the selected one of the at least one logging instrument by the second remote well operation control host by using a master remote well operation control host, of the plurality of remote well operation control hosts, on a corresponding remote well logging data acquisition management system to distribute control capabilities by establishing the first operational control relationship and the second operational control relationship.

11. The method of claim 1 further comprising establishing at least one of: i) the first operational control relationship, and ii) the second operational control relationship in dependence upon a role associated with at least one of: i) the first remote well operation control host, and ii) the second remote well operation control host by using a role-based heuristic to allocate control of at least one of i) a system, ii) a component, or iii) a computer process to the at least one of: i) the first remote well operation control host, and ii) the second remote well operation control host.

12. A method of remote well operation control, the method comprising:
conducting, with a plurality of remote well operation control hosts operating on corresponding remote well logging data acquisition management systems, a well operation using a well operation system at a well site, wherein the well operation system includes a carrier having disposed thereon a plurality of logging instruments, comprising:
establishing a first operational control relationship between a first logging instrument of the plurality of logging instruments and a first remote well operation control host of the plurality of remote well operation control hosts, the operational control relationship sufficient for the first remote well operation control host to control the first logging instrument responsive to at least one well-logging command from the first remote well operation control host;
establishing a second operational control relationship between a second of the plurality of logging instruments and a second remote well operation control host of the plurality different than the first, the operational control relationship sufficient for the second remote well operation control host to control the second logging instrument responsive to at least one well-logging command from the second remote well operation control host;
using a Wide Area Network (WAN) to transmit substantially all well logging data generated by at least one of the plurality of logging instruments from the well site to at least one of the plurality of remote well operation control hosts; and
using the logging data to control the well operation with at least one second command in substantially real-time from the at least one of the plurality of remote well operation control hosts responsive to the logging data received;
wherein the first remote well operation control host of the plurality and the second remote well operation control host of the plurality are each remote from the well site.

13. The method of claim 1, wherein:
conducting the well operation further comprises establishing the first operational control relationship and the second operational control relationship by using a master remote well operation control host, of the plurality of remote well operation control hosts, on a corresponding remote well logging data acquisition management system to distribute control capability for the carrier and the selected one of the at least one logging instrument to particular remote well operation control hosts.

14. The method of claim 12, wherein:
conducting the well control operation further comprises establishing the first operational control relationship and the second operational control relationship by using a master remote well operation control host, of the plurality of remote well operation control hosts, on a corresponding remote well logging data acquisition management system to distribute control capability for a particular instrument to a particular remote well operation control host.

15. A method of remote well operation control, the method comprising:
conducting, with a plurality of remote well operation control hosts operating on corresponding remote well logging data acquisition management systems, a well operation using a well operation system at a well, wherein the well operation system includes a carrier having disposed thereon at least one logging instrument, comprising:
establishing a first operational control relationship between the carrier and a first of the plurality of remote well operation control hosts sufficient for the first remote well operation control host to control the carrier responsive to at least one well-logging command from the first remote well operation control host;
establishing a second operational control relationship between a selected one of the at least one logging instrument and a second remote well operation control host of the plurality different than the first, the operational control relationship sufficient for the second remote well operation control host to control the at least one logging instrument responsive to at least one well-logging command from the second remote well operation control host and receive logging data; and during a logging operation, using a Wide Area Network (WAN) to transmit substantially all substantially maximum resolution raw well logging data generated by the selected one of the at least one logging instrument from the well to at least one of the plurality of remote well operation control hosts; and using the logging data to control the well operation with at least one second command in substantially real-time from the at least one of the plurality of remote well operation control hosts responsive to the logging data received.

16. A method of remote well operation control, the method comprising:

conducting, with a plurality of remote well operation control hosts operating on corresponding remote well logging data acquisition management systems, a well operation using a well operation system at a well, wherein the well operation system includes a carrier having disposed thereon at least one logging instrument, comprising:

establishing a first operational control relationship between the carrier and a first of the plurality of remote well operation control hosts sufficient for the first remote well operation control host to control the carrier responsive to at least one well-logging command from the first remote well operation control host;

establishing a second operational control relationship between a selected one of the at least one logging instrument and a second remote well operation control host of the plurality different than the first, the operational control relationship sufficient for the second remote well operation control host to control the at least one logging instrument responsive to at least one well-logging command from the second remote well operation control host and receive logging data wherein conducting the well control operation further comprises establishing the first operational control relationship and the second operational control relationship by using a master remote well operation control host, of the plurality of remote well operation control hosts, on a corresponding remote well logging data acquisition management system to distribute control capability for a particular instrument to a particular remote well operation control host.

17. A method of remote well operation control, the method comprising:

conducting, with a plurality of remote well operation control hosts operating on corresponding remote well logging data acquisition management systems, a well logging operation using a well operation system at a well site, wherein the well operation system includes a carrier having disposed thereon at least one logging instrument, comprising:

establishing a first operational control relationship between the carrier and a first remote well operation control host of the plurality of remote well operation control hosts sufficient for the first remote well operation control host to control the carrier responsive to at least one well-logging command from the first remote well operation control host;

establishing a second operational control relationship between a selected one of the at least one logging instrument and a second remote well operation control host of the plurality different than the first, the operational control relationship sufficient for the second remote well operation control host to control the at least one logging instrument responsive to at least one well-logging command from the second remote well operation control host and receive logging data;

wherein conducting the well control operation further comprises establishing the first operational control relationship and the second operational control relationship by using a master remote well operation control host, of the plurality of remote well operation control hosts, on a corresponding remote well logging data acquisition management system to distribute control capability for a particular instrument to a particular remote well operation control host.

18. A method of remote well operation control, the method comprising:

conducting, with a plurality of remote well operation control hosts operating on corresponding remote well logging data acquisition management systems, a well logging operation using a well operation system at a well site, wherein the well operation system includes a carrier having disposed thereon at least one logging instrument, comprising:

establishing a first operational control relationship between the carrier and a first remote well operation control host of the plurality of remote well operation control hosts sufficient for the first remote well operation control host to control the carrier responsive to at least one well-logging command from the first remote well operation control host;

establishing a second operational control relationship between a selected one of the at least one logging instrument and a second remote well operation control host of the plurality different than the first, the operational control relationship sufficient for the second remote well operation control host to control the at least one logging instrument responsive to at least one well-logging command from the second remote well operation control host and receive logging data;

wherein establishing at least one of: i) the first operational control relationship, and ii) the second operational control relationship is conducted in dependence upon a role associated with at least one of: i) the first remote well operation control host, and ii) the second remote well operation control host by using a role-based heuristic to allocate control of at least one of i) a system, ii) a component, or iii) a computer process to the at least one of: i) the first remote well operation control host, and ii) the second remote well operation control host; and wherein the first remote well operation control host of the plurality and the second remote well operation control host of the plurality are each remote from the well site.

19. A method of remote well operation control, the method comprising:

conducting, with a plurality of remote well operation control hosts operating on corresponding remote well logging data acquisition management systems, a well operation using a well operation system at a well site, wherein the well operation system includes a carrier having disposed thereon a plurality of logging instruments, comprising:

establishing a first operational control relationship between a first logging instrument of the plurality of logging instruments and a first remote well operation control host of the plurality of remote well operation control hosts, the operational control relationship sufficient for the first remote well operation control host to control the first logging instrument responsive to at least one well-logging command from the first remote well operation control host;

establishing a second operational control relationship between a second of the plurality of logging instruments and a second remote well operation control host of the plurality different than the first, the operational control relationship sufficient for the second remote well operation control host to control the second logging instrument responsive to at least one well-logging command from the second remote well operation control host;

wherein the first remote well operation control host of the plurality and the second remote well operation control host of the plurality are each remote from the well site; and wherein establishing at least one of: i) the first operational control relationship, and ii) the second operational control relationship is conducted in dependence upon a role associated with at least one of: i) the first remote well operation control host, and ii) the second remote well operation control host by using a role-based heuristic to allocate control of at least one of i) a system, ii) a component, or iii) a computer process to the at least one of: i) the first remote well operation control host, and ii) the second remote well operation control host.

* * * * *